US012705280B2

(12) United States Patent
Mahfuz et al.

(10) Patent No.: US 12,705,280 B2
(45) Date of Patent: Aug. 11, 2026

(54) SOUND SEARCH USING CAPTION EMBEDDINGS

(71) Applicant: QUALCOMM Incorporated, San Diego, CA (US)

(72) Inventors: Rehana Mahfuz, San Diego, CA (US); Yinyi Guo, San Diego, CA (US); Erik Visser, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 211 days.

(21) Appl. No.: 18/326,261

(22) Filed: May 31, 2023

(65) Prior Publication Data

US 2024/0134908 A1 Apr. 25, 2024
US 2024/0232258 A9 Jul. 11, 2024

Related U.S. Application Data

(60) Provisional application No. 63/380,682, filed on Oct. 24, 2022.

(51) Int. Cl.
*G06F 16/00* (2019.01)
*G06F 16/632* (2019.01)
(Continued)

(52) U.S. Cl.
CPC .......... *G06F 16/685* (2019.01); *G06F 16/632* (2019.01); *G06F 16/638* (2019.01); *G06F 16/686* (2019.01)

(58) Field of Classification Search
CPC .... G06F 16/685; G06F 16/638; G06F 16/686; G06F 16/632
(Continued)

(56) References Cited

U.S. PATENT DOCUMENTS 12,087,320 B1 * 9/2024 Zhang ..................... G10L 15/22
12,105,755 B1 * 10/2024 Omar ..................... G06N 3/045
(Continued)

FOREIGN PATENT DOCUMENTS

GB 2459308 A 10/2009
WO 2012135293 A2 10/2012

OTHER PUBLICATIONS

International Search Report and Written Opinion—PCT/US2023/075961—ISA/EPO—Jan. 16, 2024.
(Continued)

*Primary Examiner* — Raquel Perez-Arroyo
(74) *Attorney, Agent, or Firm* — QUALCOMM Incorporated; Espartaco Diaz Hidalgo

(57) ABSTRACT

A device includes one or more processors configured to generate one or more query caption embeddings based on a query. The processor(s) are further configured to select one or more caption embeddings from among a set of embeddings associated with a set of media files of a file repository. Each caption embedding represents a corresponding sound caption, and each sound caption includes a natural-language text description of a sound. The caption embedding(s) are selected based on a similarity metric indicative of similarity between the caption embedding(s) and the query caption embedding(s). The processor(s) are further configured to generate search results identifying one or more first media files of the set of media files. Each of the first media file(s) is associated with at least one of the caption embedding(s).

30 Claims, 15 Drawing Sheets

(51) Int. Cl.

| | |
|---|---|
| ***G06F 16/638*** | (2019.01) |
| ***G06F 16/68*** | (2019.01) |
| ***G06F 16/683*** | (2019.01) |

(58) Field of Classification Search

USPC .......................................................... 707/749

See application file for complete search history.

(56) References Cited

U.S. PATENT DOCUMENTS

| | | | | |
|---|---|---|---|---|
| 2010/0257129 | A1* | 10/2010 | Lyon | G06F 16/683 707/723 |
| 2014/0095166 | A1 | 4/2014 | Bell et al. | |
| 2016/0336026 | A1* | 11/2016 | Bell | G10L 25/54 |
| 2018/0061439 | A1* | 3/2018 | Diamos | G10L 15/183 |
| 2019/0391999 | A1* | 12/2019 | Goldstein | G10L 25/54 |

OTHER PUBLICATIONS

BERT: Pre-training of Deep Bidirectional Transformers for Language Understanding, Google AI Language, May 24, 2019, pp. 1-16.

* cited by examiner

SOUND SEARCH USING CAPTION EMBEDDINGS

I. CROSS-REFERENCE TO RELATED APPLICATIONS

The present application claims priority from the commonly owned U.S. Provisional Patent Application No. 63/380,682, filed Oct. 24, 2022, entitled "SOUND SEARCH," the content of which is incorporated herein by reference in its entirety.

II. FIELD

The present disclosure is generally related to searching media content for particular sounds.

III. DESCRIPTION OF RELATED ART

Advances in technology have resulted in smaller and more powerful computing devices as well as an increase in the availability of and consumption of media. For example, there currently exist a variety of portable personal computing devices, including wireless telephones such as mobile and smart phones, tablets and laptop computers that are small, lightweight, and easily carried by users and that enable generation of media content and consumption of media content nearly anywhere.

Portable devices capable of capturing audio, video, or both, in the form of media files have become quite common. One consequence of the availability of such devices is that many people regularly capture and store media files on their devices to save personal memories that they want to be able to access at a later time. However, as the amount of media (e.g., pictures, video, audio) stored increases, it becomes difficult to search for desired media content. While pictures can be searched using certain modern search techniques, solutions for searching audio of media files (e.g., an audio file or a video file) are lacking.

IV. SUMMARY

According to a particular aspect, a device includes one or more processors configured to generate one or more query caption embeddings based on a query. The one or more processors are further configured to select one or more caption embeddings from among a set of embeddings associated with a set of media files of a file repository. Each caption embedding represents a corresponding sound caption, and each sound caption includes a natural-language text description of a sound. The one or more caption embeddings are selected based on a similarity metric indicative of similarity between the one or more caption embeddings and the one or more query caption embeddings. The one or more processors are further configured to generate search results identifying one or more first media files of the set of media files. Each of the one or more first media files is associated with at least one of the one or more caption embeddings.

According to a particular aspect, a method includes generating, by one or more processors, one or more query caption embeddings based on a query. The method further includes selecting, by the one or more processors, one or more caption embeddings from among a set of embeddings associated with a set of media files of a file repository. Each caption embedding represents a corresponding sound caption, and each sound caption includes a natural-language text description of a sound. The one or more caption embeddings are selected based on a similarity metric indicative of similarity between the one or more caption embeddings and the one or more query caption embeddings. The method further includes generating, by the one or more processors, search results identifying one or more first media files of the set of media files. Each of the one or more first media files is associated with at least one of the one or more caption embeddings.

According to a particular aspect, a non-transitory computer-readable medium stores instructions that, when executed by one or more processors, cause the one or more processors to generate one or more query caption embeddings based on a query. The instructions are further executable to cause the one or more processors to select one or more caption embeddings from among a set of embeddings associated with a set of media files of a file repository. Each caption embedding represents a corresponding sound caption, and each sound caption includes a natural-language text description of a sound. The one or more caption embeddings are selected based on a similarity metric indicative of similarity between the one or more caption embeddings and the one or more query caption embeddings. The instructions are further executable to cause the one or more processors to generate search results identifying one or more first media files of the set of media files. Each of the one or more first media files is associated with at least one of the one or more caption embeddings.

According to a particular aspect, an apparatus includes means for generating one or more query caption embeddings based on a query. The apparatus further includes means for selecting one or more caption embeddings from among a set of embeddings associated with a set of media files of a file repository. Each caption embedding represents a corresponding sound caption, and each sound caption includes a natural-language text description of a sound. The one or more caption embeddings are selected based on a similarity metric indicative of similarity between the one or more caption embeddings and the one or more query caption embeddings. The apparatus further includes means for generating search results identifying one or more first media files of the set of media files. Each of the one or more first media files is associated with at least one of the one or more caption embeddings.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

V. DETAILED DESCRIPTION

Figure 1:
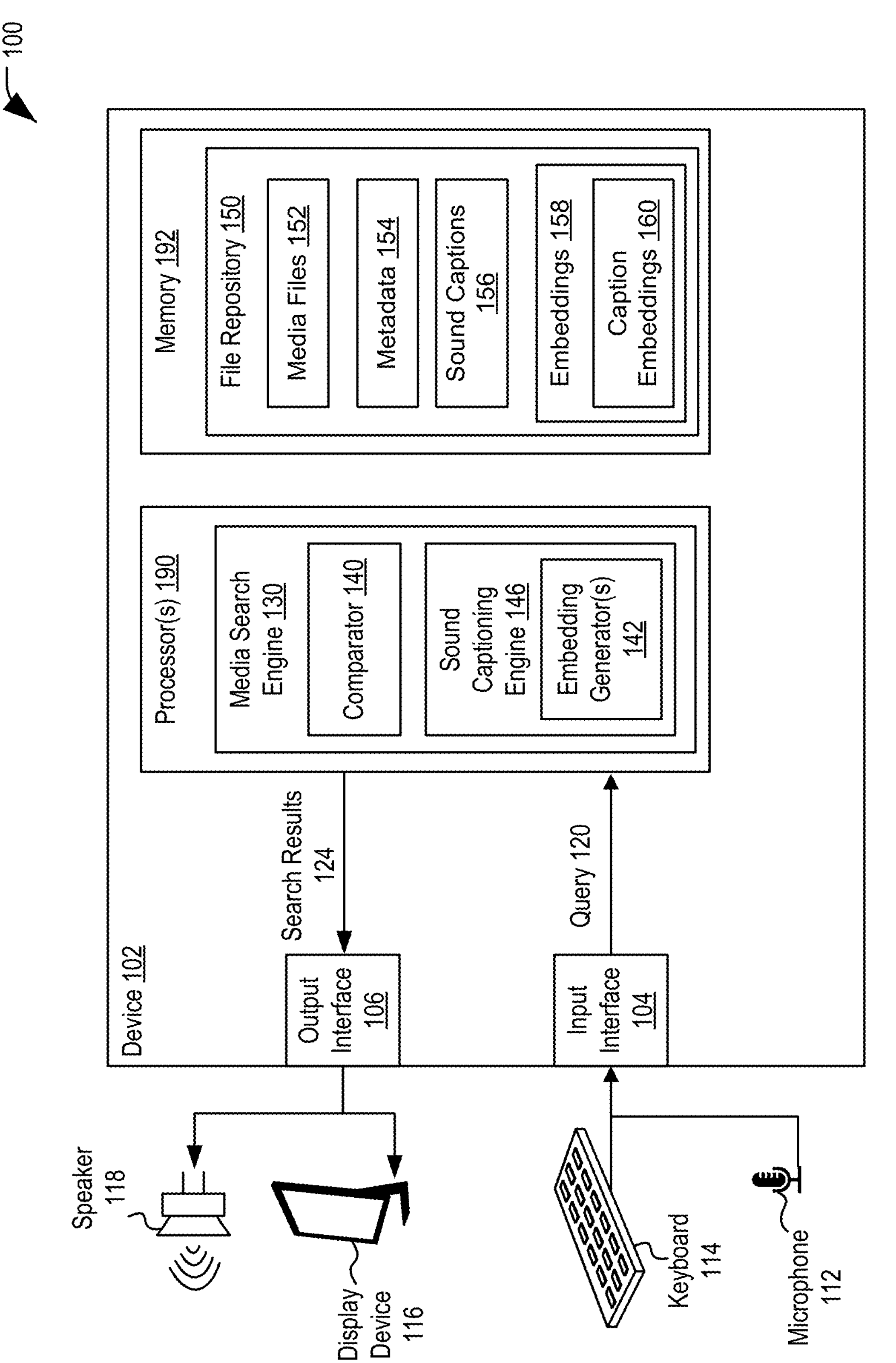
FIG. 1 is a block diagram of a particular illustrative aspect of a system operable to search media files for sounds, in accordance with some examples of the present disclosure.

While a lot of information can be retrieved from images and videos, an auditory scene captured by a microphone includes complementary information that may not be captured by images and video alone. Developing techniques for summarizing or understanding auditory scenes is challenging. One step towards developing audio understanding is audio tagging, which involves detecting the occurrence of any common sounds from a finite set of sounds. While audio tagging is useful in some situations, audio captioning would provide a richer information set since captions use more natural human language to describe sounds. Natural-language audio captions may also enable description of sounds that cannot be directly tagged with pre-defined labels, such as sounds that do not fit readily into any of the common categories.

Searching of media files is enabled using media captioning and semantic encoding. For example, captions are generated to describe particular sounds detected in the media files, and semantic encoding is used to generate caption embeddings representing the sound captions. In some implementations, certain sounds detected in the media files may also be processed to generate corresponding audio embeddings representing the sounds. Further, in some implementations, certain sounds detected in the media files may be processed to generate sound tags describing the sounds, and text embeddings (e.g., tag embeddings) may be generated to represent the sound tags.

Each media file and its corresponding embeddings (e.g., caption embeddings, audio embeddings, tag embeddings, or a combination thereof, representing sounds in each media file) is stored in a file repository. The metadata associated with the media files may also be stored in the file repository. The embeddings, and optionally the metadata, may be used to facilitate searching audio content of media files of the file repository.

In a particular aspect, when a user provides a query, the query may be used to generate a query embedding. Search results may be generated based on similarity of the query embedding to embeddings associated with the media files.

For example, if the query includes natural-language text, at least a portion of the text may be used to generate a query caption embedding (e.g., a sentence embedding). In this example, the query caption embedding may be compared, in a caption embedding space, to caption embeddings associated with the media files to determine a similarity metric, and the search results may be determined based on the similarity metric. As used herein, a "query caption embedding" refers to an embedding that represents multiple words that together form a semantic unit (e.g., a description of a sound).

As another example, if the query includes audio, the audio may be processed to generate one or more sound captions, which may be processed to generate a query caption embedding. Optionally, the audio may also be processed to generate one or more sound tags and corresponding tag embeddings, processed to generate one or more audio embeddings, or both. The embedding(s) representing the query (e.g., the caption embedding(s), the tag embedding(s), audio embedding(s), or a combination thereof), may be compared to the embeddings associated with the media files to determine similarity metrics.

Search results are generated based on the similarity metrics. Determining similarity of text-based embeddings (e.g., natural-language text of captions or tags) in embedding space provides search results that represent semantically similar concepts to concepts present in the query. For example, if the query states "a bell ringing multiple times", the search results may list sounds that are captioned as representing "a metal object striking a metal object". Thus, even if the query does not exactly match a caption, the search results can list sounds with semantically similar descriptors. Further, the sounds can include any sound that can be captured in a media file and captioned.

Particular aspects of the present disclosure are described below with reference to the drawings. In the description, common features are designated by common reference numbers. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 2, multiple media files are illustrated and associated with reference numbers 152A and 152N. When referring to a particular one of these media files, such as the media file 152A, the distinguishing letter "A" is used. However, when referring to any arbitrary one of these media files or to these media files as a group, the reference number 152 is used without a distinguishing letter.

As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 190 of FIG. 1), which indicates that in some implementations the device 102 includes a single processor 190 and in other implementations the device 102 includes multiple processors 190. For ease of reference herein, such features are generally introduced as "one or more" features and are subsequently referred to in the singular or optional plural (as indicated by "(s)" in the name of the feature) unless aspects related to multiple of the features are being described.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

As used herein, the term "machine learning" should be understood to have any of its usual and customary meanings within the fields of computers science and data science, such meanings including, for example, processes or techniques by which one or more computers can learn to perform some operation or function without being explicitly programmed to do so. As a typical example, machine learning can be used to enable one or more computers to analyze data to identify patterns in data and generate a result based on the analysis. For certain types of machine learning, the results that are generated include a data model (also referred to as a "machine-learning model" or simply a "model"). Typically, a model is generated using a first data set to facilitate analysis of a second data set. For example, a first portion of a large body of data may be used to generate a model that can be used to analyze the remaining portion of the large body of data. As another example, a set of historical data can be used to generate a model that can be used to analyze future data. Examples of machine-learning models include, without limitation, perceptrons, neural networks, support vector machines, regression models, decision trees, Bayesian models, Boltzmann machines, adaptive neuro-fuzzy inference systems, as well as combinations, ensembles and variants of these and other types of models. Variants of neural networks include, for example and without limitation, prototypical networks, autoencoders, transformers, self-attention networks, convolutional neural networks, deep neural networks, deep belief networks, etc. Variants of decision trees include, for example and without limitation, random forests, boosted decision trees, etc.

Since machine-learning models are generated by computer(s) based on input data, machine-learning models can be discussed in terms of at least two distinct time windows—a creation/training phase and a runtime phase. During the creation/training phase, a model is created, trained, adapted, validated, or otherwise configured by the computer based on the input data (which in the creation/training phase, is generally referred to as "training data"). Note that the trained model corresponds to software that has been generated and/or refined during the creation/training phase to perform particular operations, such as classification, prediction, encoding, or other data analysis or data synthesis operations. During the runtime phase (or "inference" phase), the model is used to analyze input data to generate model output. The content of the model output depends on the type of model. For example, a model can be trained to perform classification tasks or regression tasks, as non-limiting examples. In some implementations, a model may be continuously, periodically, or occasionally updated, in which case training time and runtime may be interleaved or one version of the model can be used for inference while a copy is updated, after which the updated copy may be deployed for inference.

FIG. 1 is a block diagram of a particular illustrative aspect of a system 100 operable to search media files for sounds, in accordance with some examples of the present disclosure.

The system 100 includes a device 102 that includes one or more processors 190 and memory 192. In FIG. 1, the memory 192 includes a file repository 150 storing media files 152 and associated data, such as metadata 154 associated with each of the media files 152, sound captions 156 associated with the media files 152, and embeddings 158 associated with the media files 152 (e.g., caption embeddings 160 associated with the sound captions 156). Additionally in FIG. 1, the processor(s) 190 include a media search engine 130 configured to perform search operations to find portions of the media files 152 that represent particular sounds. Although FIG. 1 illustrates the media search engine 130 and the file repository 150 on the same device, in other implementations, the file repository 150 is stored at a different device than the device 102 that includes the media search engine 130. In some implementations, the file repository 150, the media search engine 130, or both, are distributed across several devices (e.g., across a distributed computing system).

The device 102 is coupled, via an input interface 104, to one or more input devices, such as a microphone 112 and a keyboard 114. The device 102 is also coupled, via an output interface 106, to one or more output devices, such as a display device 116 and a speaker 118. In some implementations, one or more of the input devices, the output devices, or both, are integrated within the same housing as the processor(s) 190. For example, the microphone 112, the keyboard 114, the display device 116, the speaker 118, or a combination thereof, may be built into the device 102. In some implementations, two or more of the input devices, the output devices, or both, are combined. To illustrate, the display device 116 may include a touchscreen device and the keyboard 114 may be a virtual keyboard presented via the touchscreen device. Further, in some implementations, the device 102 is coupled to or includes more, fewer, or different input devices; is coupled to or includes more, fewer, or different output devices; or both.

In a particular aspect, the device 102 is operable to receive a query 120 indicating a target sound via one or more input devices, to perform search operations to identify possible matches to the target sound in a media file or a portion of a media file of the media files 152, and to provide search results 124 to the one or more output devices based on the search operations. The query 120 can include audio or text. An example of an audio query includes speech of a user describing the target sound. Another example of the audio query includes a non-speech sound representative of the target sound. An example of a text query includes a sequence of natural-language words describing the target sound.

The search results 124 can also include sounds or text (and possibly other display elements, such as graphical elements or hyperlinks). As an example of search results 124 that include sound, the device 102 may send to the speaker 118 portions of the media files 152 that are potential matches to the target sound. As an example of search results 124 that include text, the device 102 may send to the display device 116 text indicating media files 152 or portions of the media files 152 that are potential matches to the target sound.

In a particular aspect, the media search engine 130 is operable to search the file repository 150 for any sound. For example, the target sound can include any sound, including for example, human vocal sounds (e.g., speech sounds) and non-speech sounds (e.g., human made sounds other than speech and sounds that are not produced by humans). To illustrate, the media files 152 may include any number and variety of sounds that can be captured using audio capture equipment (e.g., the microphone 112) and stored in a digital format in the memory 192, and the media search engine 130 is operable to search the media files 152 for any of these sounds. Further, the media search engine 130 is operable to search the media files 152 for any type of sounds based on a text query or based on an audio query.

In the example of FIG. 1, the media search engine 130 includes a comparator 140 and a sound captioning engine 146, which includes one or more embedding generators 142. In some implementations, the media search engine 130 includes additional components, as described further below.

The sound captioning engine 146 is configured to generate sound captions that describe sounds detected in input audio data. For example, when a new media file 152 is captured or stored to the file repository 150, the sound captioning engine 146 may process the new media file 152 to generate one or more sound captions descriptive of sounds detected in the new media file 152 and store the sound caption(s) descriptive of sounds detected in the new media file 152 with the sound captions 156 in the file repository 150. As used herein, a "sound caption" refers to a natural-language description of a sound. For example, a sound caption may include a sequence of words that together (rather than individually) describe the sound. To illustrate, a sound caption for the sound of a bell ringing may include text such as "a metal object striking a metal object". In this illustrative example, the sound caption is an entire clause or sentence that describes the sound. Note that in this illustrative example, no individual word of the sound caption represents the sound; rather, the sound caption as a whole acts as a semantic unit descriptive of the sound. In some implementations, as described further below, sound tags may also be used to describe sounds. As used herein, a "sound tag" refers to a word or word token that describes the sound. To illustrate, a sound tag describing the sound of a bell ringing may include text such as "bell" or "ringing". Thus, while sound captions and sound tags are each text labels describing sounds, sound captions include more natural descriptions of the sound (e.g., how a human presented with the sound might describe the sound). Thus, using sound captions can facilitate better matching to queries presented by users. Further, sound captions can present richer semantic information which, when used with semantic similarity based searching, facilitates identification of search results from a broader range of options.

The sound captioning engine 146 includes one or more machine-learning models. For example, the sound captioning engine 146 may include one or more embedding generators 142, each of which corresponds to or includes at least one trained machine-learning model. As an example, the embedding generator(s) 142 may include an audio embedding generator that is configured to receive audio data as input and to generate an audio embedding (e.g., a vector or array) representing the audio data as an output. In this example, the sound captioning engine 146 may also include a tag embedding network coupled to the audio embedding network. The tag embedding network is configured to receive the audio embedding as input and to generate one or more tag embeddings as output. In this example, each tag embedding represents a word or word token of a sound tag. Further, in the example of FIG. 1, the sound captioning engine 146 may include a caption embedding generator configured to generate one or more sound caption embeddings based on the tag embedding(s).

In some implementations, the sound captioning engine 146 is operable to process data received via the query 120 to generate one or more embeddings used by the media search engine 130. Additionally, the sound captioning engine 146 may be operable to generate embeddings 158 representing various data stored in the file repository 150. For example, when a new media file 152 is added to the file repository 150, the sound captioning engine 146 may generate a caption embedding 160 representing a sound caption 156 of the new media file 152. In some implementations, the sound captioning engine 146 also generates and stores in the embeddings 158 one or more audio embeddings, one or more tag embeddings, or both, representing sounds detected in the new media file 152.

The sound captioning engine 146 may also be used during a search of the file repository 150 to process audio data received via the query 120. For example, when the query 120 includes audio data, the sound captioning engine 146 generates a caption embedding representing a sound caption descriptive of a sound detected in the audio data of the query. In some implementations, the sound captioning engine 146 may also process the audio data to generate an audio embedding of the audio data, may process one or more sound tags representing the sound detected in the audio data to generate tag embedding(s), or both.

The comparator 140 is configured to determine similarity between query embedding(s) based on the query 120 and the embeddings 158 associated with the media files 152. For example, each embedding of a particular type can be viewed as a vector designating a point in an embedding space associated with that type of embedding. To illustrate, each of the caption embeddings 160 can be viewed as a vector designating a particular location in a caption embedding space. Likewise, if the file repository 150 includes audio embeddings, each of the audio embeddings can be viewed as a vector designating a particular location in an audio embedding space. Also, if the file repository 150 includes tag embeddings, each of the tag embeddings can be viewed as a vector designating a particular location in a tag embedding space. In this example, the comparator 140 determines similarity between a query embedding and an embedding of the embeddings 158 based on a metric (e.g., a similarity metric) associated with relative positions, in the appropriate embedding space, of the two embeddings. One benefit of such a comparison is that text-based embeddings with similar semantic content will tend to be closer to one another in a text-based embedding space than embeddings with dissimilar content.

The search results 124 generated may be sorted (e.g., ranked) based on values of their similarity metrics. For example, if a first caption embedding is closer (in a caption embedding space) to the query embedding than a second caption embedding is, a search result associated with the first caption embedding may be ranked higher in the search results 124 than a search result associated with the second caption embedding.

In some implementations, the query 120 can be used to generate multiple types of embeddings, which are compared to corresponding embeddings 158 (e.g., embeddings of the same type) of the file repository 150. For example, a query caption embedding based on the query 120 can be compared to the caption embeddings 160, a query audio embedding based on the query 120 can be compared to audio embeddings associated with the media files 152, a query tag embedding based on the query 120 can be compared to tag embeddings associated with the media files 152, or a combination thereof. In such implementations, search results based on comparisons of different types of embeddings may be weighted differently to generate a ranked listing of the search results 124. To illustrate, to rank the search results 124, a first weight may be applied to caption embedding similarity values, a second weight may be applied to audio embedding similarity values, and a third weight may be applied to tag embedding similarity values.

In some implementations, the specific set of the embeddings 158 that are compared to the query embedding(s) may be determined based, at least in part, on the metadata 154. For example, the query 120 may include information descriptive of a target sound (e.g., a target sound description) and context terms. In this example, the context terms can be compared to the metadata 154 to select a subset of the embeddings 158 that are to be compared to one or more query embeddings based on the target sound description. To illustrate, the query 120 may include "where is that video of the bell ringing multiple times that I took last week?" In this illustrative example, the term "video" is a context term indicating a file type of a target media file, "last week" is a context term indicating a range of time stamps when the target media file was created, "I took" is a context term indicating a source of the target media file, and "bell ringing multiple times" is a target sound description of a particular sound in the target media file. In this illustrative example, the comparator 140 compares embedding(s) based on the target sound description to a subset of the embeddings 158 that are associated with metadata 154 that satisfy the filter criteria determined from the context terms.

Thus, the system 100 enables searching for specific sounds among a set of media files 152. The system 100 can search for any type of sound, not just, for example, particular speech or music samples. Further, the system 100 can use intuitive search queries 120, such as natural-language text, while optionally also supporting searching based on audio queries. When searching based on a text-based query 120, the system 100 is able to identify search results 124 that are associated with sound descriptions (e.g., sound captions and optionally sound tags) that are semantically similar to the query 120. Thus, a user is not required to generate a query 120 that exactly matches a particular sound description in order to obtain useful search results.

Figure 2:
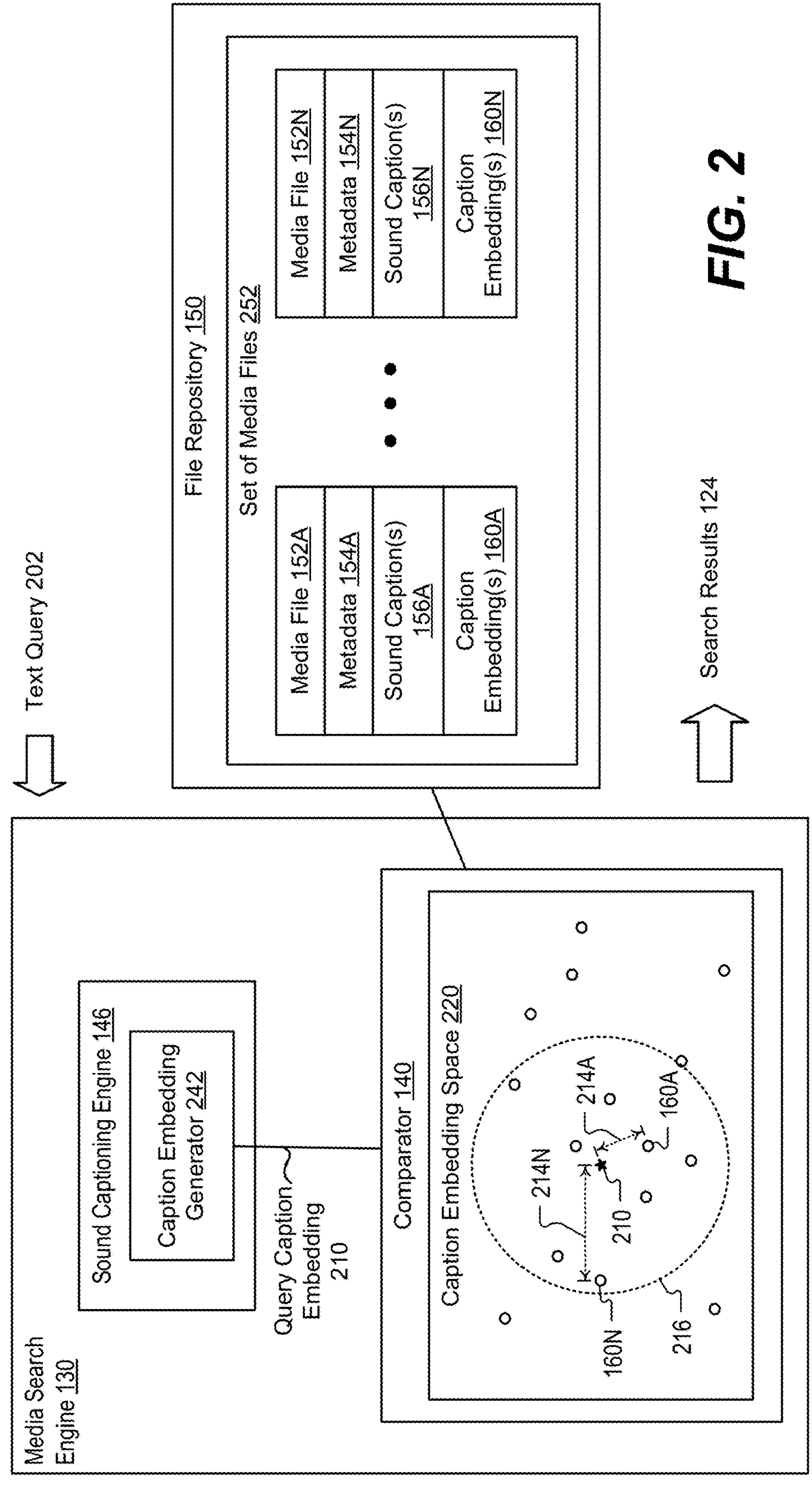
FIG. 2 is a diagram of particular aspects of the system of FIG. 1, in accordance with some examples of the present disclosure.

FIG. 2 is a diagram of particular aspects of the system of FIG. 1, in accordance with some examples of the present disclosure. In particular, FIG. 2 illustrates an example of operation of the media search engine 130 to search the file repository 150 based on a text query 202. Note in some implementations, the text query 202 may be generated using a speech-to-text engine; however, it need not be. The media search engine 130 operates in the same manner, as described below, irrespective of whether a user types the text query 202 into the device 102 of FIG. 1, or the user speaks the query 120 into the device 102 and a speech-to-text engine of the device 102 converts the speech into the text query. In either case, the text query 202 includes a description of a target sound, rather than, for example, specific words that are to be searched for in the media files 152.

In FIG. 2, the media search engine 130 includes the comparator 140 and the sound captioning engine 146, which in FIG. 2, includes a caption embedding generator 242. The caption embedding generator 242 is one example of the embedding generator(s) 142 of FIG. 1. The caption embedding generator 242 is configured to generate caption embeddings (e.g., a query caption embedding 210) based on a set of text. For example, the caption embedding generator 242 may include a sentence embedding generator and the query caption embedding 210 may include a sentence embedding based on text of a text query 202. As another example, the caption embedding generator 242 may generate a caption embedding 160 based on text of a sound caption 156. In a particular implementation, the caption embedding generator 242 includes or corresponds to one or more trained models (e.g., machine-learning models), such as one or more neural networks.

In a particular implementation, the caption embedding generator 242 passes text or one or more word tokens representing the text through one or more neural networks that are trained to generate the query caption embedding 210. Each query caption embedding can be viewed as a vector indicating a location in a high-dimensional text embedding space (e.g., a caption embedding space 220). The one or more neural networks of the caption embedding generator 242 are trained using a large corpus of sounds and corresponding sound captions such that locations in the caption embedding space 220 are indicative of semantic and syntactic relationships (e.g., similarity) among sound captions. As a result of such training, proximity of vectors in the caption embedding space 220 is indicative of similarity of semantic content of the sound captions represented by the vectors.

In FIG. 2, the file repository 150 includes a set of media files 252, including a media file 152A, a media file 152N, and possibly one or more additional media files (as indicated by ellipsis in FIG. 2). The media files 152 include, for example, audio files, video files, virtual reality files, game files, or a combination thereof. Each of the media files 152 is associated with one or more sound captions 156, and each sound caption 156 is associated with a caption embedding 160. Each sound caption 156 includes text (e.g., a sequence of natural-language text) descriptive of a sound in the media file 152 associated with the sound caption 156. As each media file 152 may include more than one sound, more than one sound caption 156 may be associated with each media file 152. In some implementations, the metadata 154 includes a time stamp for each sound caption 156, and the time stamp indicates a time index in the media file 152 of the sound described by the sound caption 156. The metadata 154 may also, or alternatively, include context information associated with the media files 152. For example, the metadata 154A may indicate a date when the media file 152A was created or added to the file repository 150, a location at which the media file 152A was created, a user that created the media file 152A, a title of the media file 152A, etc. In a particular implementation, when a new media file is added to the file repository 150, corresponding metadata 154, sound caption(s) 156, and caption embedding(s) 158 may be generated and stored with the media file 152.

In FIG. 2, the comparator 140 is configured to determine a similarity metric indicating how similar each caption embedding 160 is to the query caption embedding 210 representing the text query 202. FIG. 2 includes a simplified, two-dimensional representation of the caption embedding space 220 to illustrate a process for determining similarity of the caption embeddings 160 to the query caption embedding 210; however, in actual implementations, an embedding space will be a high-dimensional space defined by hundreds or thousands of orthogonal axes.

In FIG. 2, a location of the query caption embedding 210 in the caption embedding space 220 is indicated by a star, and locations of various caption embeddings 160 in the caption embedding space 220 are indicated by circles. During operation, the comparator 140 is configured to determine the similarity metric for each caption embedding 160 based on a distance 214, in the caption embedding space 220, between the caption embedding 160 and the query caption embedding 210. The distance 214 may be determined, for example, as a cosine distance, a Euclidean distance, or based on some other distance measure. In the example illustrated in FIG. 2, a distance 214A between the location of the query caption embedding 210 and the location of the caption embedding 160A is less than a distance 214B between the location of the query caption embedding 210 and the location of the caption embedding 160N, which indicates that the sound caption 156A represented by the caption embedding 160A is more semantically similar to the text of the text query 202 than is the sound caption 156N represented by the caption embedding 160N. In some implementations, the distances 214 are used as the similarity metric. In such cases, a smaller value of the similarity metric (indicating a smaller distance) indicates closer match of a sound caption 156 to the text of the text query 202. In some implementations, the similarity metric is calculated based on the distances 214 such that a larger value of the similarity metric is indicative of a smaller distance 214 (and therefore a closer match of a sound caption 156 to the text of the text query 202).

The media search engine 130 generates the search results 124 based on similarity metrics associated with the sound captions 156. For example, the search results 124 may identify one or more media files 152 (or portions of media files 152, such as a portion of a media file 152 associated with a particular sound caption 156) associated with a set of the caption embeddings 160 that are most similar, among the set of media files 252, to the query caption embedding 210. If the metadata 154 includes a time index associated with a particular sound that is identified in the search results 124, the time index may be indicated in the search results 124. In some implementations, the search results 124 include a rank sorted list of results. In such implementations, the search results 124 may be sorted based on their respective similarity metrics.

In some implementations, the search results 124 list each of the media files 152 (or portions of media files 152) in rank order based on the similarity metrics of their sound captions 156. In some implementations, the media search engine 130 limits the search results 124 to include only information associated with media files 152 that are associated with caption embeddings 160 that are within a threshold distance 216 of the query caption embedding 210 in the caption embedding space 220. In such implementations, the threshold distance 216 may be preset (e.g., based on a user configurable option) or may be dynamically determined. As an example, the threshold distance 216 may be determined such than a specific percentage or other proportion of the caption embeddings 160 are within the threshold distance 216. To illustrate, the threshold distance 216 may be determined to include no more than 25%, 50%, 75% or some other percentage, of the caption embeddings 160. Although FIG. 2 illustrates a threshold in terms of distance in the caption embedding space 220, in other implementations, the threshold may instead be applied in terms of the similarity metric. In still other implementations, the search results 124 may be limited to include only a specific number of most similar results (e.g., irrespective of their distance in the caption embedding space 220).

Figure 3:
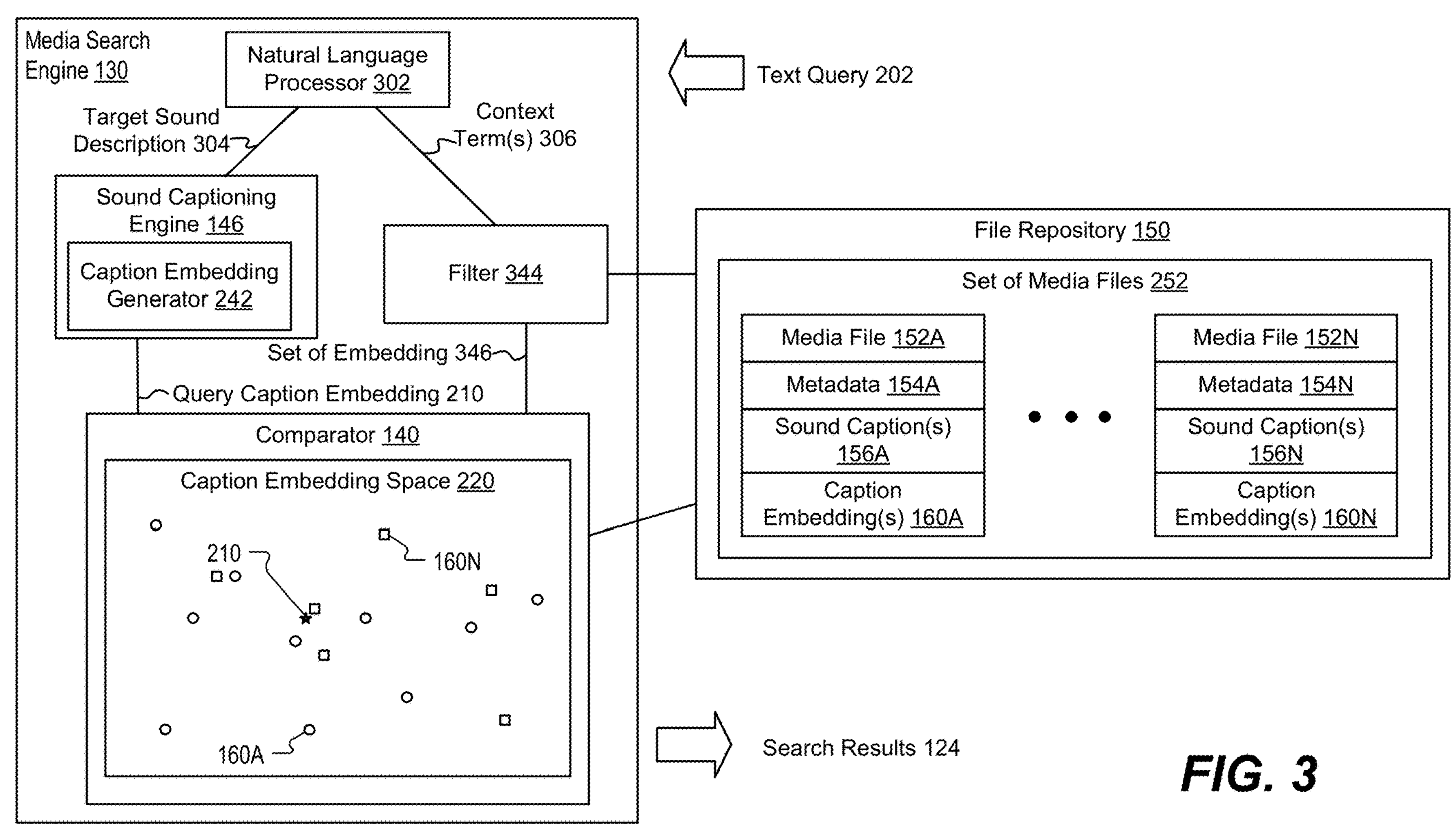
FIG. 3 is a diagram of particular aspects of the system of FIG. 1, in accordance with some examples of the present disclosure.

FIG. 3 is a diagram of particular aspects of the system of FIG. 1, in accordance with some examples of the present disclosure. In particular, FIG. 3 illustrates an example of operation of the media search engine 130 to search the file repository 150 based on a text query 202 that includes a description of a target sound (e.g., a target sound description 304) and one or more context terms 306.

In FIG. 3, the media search engine 130 includes the comparator 140 and the sound captioning engine 146 (which includes the caption embedding generator 242), each of which operate as described above with reference to FIG. 2. For example, the caption embedding generator 242 is configured to generate caption embeddings (e.g., sentence embeddings) based on a set of text of the text query 202. In the example illustrated in FIG. 3, the set of text provided to the caption embedding generator 242 corresponds to the target sound description 304. In other implementations, the target sound description 304 and the context term(s) 306 are provided to the caption embedding generator 242. The comparator 140 is configured to determine a similarity metric indicating how similar caption embeddings 160 of the set of media files 252 are to the query caption embeddings 210 representing the target sound description 304.

In FIG. 3, the media search engine 130 also includes a natural language processor 302 and a filter 344. The natural language processor 302 is configured to process the text query 202 to identify the portion of the text query 202 that corresponds to the target sound description 304 and the portion of the text query 202 that corresponds to the context term(s) 306. As illustrated in FIG. 3, at least the target sound description 304 is provided to the caption embedding generator 242, and the context term(s) 306 are provided to the filter 344.

The filter 344 is configured to select from the file repository 150 one or more media files 152 that are associated with metadata 154 that satisfies filter criteria based on the context term(s) 306. For example, the context term(s) 306 may indicate a time period of interest, and the filter 344 may compare timestamps of the metadata 154 to the time period of interest to determine which media files 152 have timestamps within the specified time period. As another example, the context term(s) 306 may indicate a target file type (e.g., a video file, an audio file, or another type of file), and the filter 344 may compare file type information of the metadata 154 to the target file type to determine which media files 152 have the target file type. In other examples, the filter 344 can apply different filter criteria (in addition to or instead of a time criterion and/or a file type criterion). Non-limiting examples of such filter criteria include a location at which a media file was generated, a source of the media file, etc. In some implementations, the filter 344 can also receive input from other types of media search engines. To illustrate, an image search engine can be used to tag objects (e.g., faces) recognized in particular video files of the media files 152, and such object tags can be saved in the metadata 154 and used by the filter 344.

In a particular implementation, the filter 344 is configured to select from among the caption embeddings 160 of the set of media files 252 a set of embeddings 346 that satisfy the filter criteria. In this implementation, the filter 344 pre-screens the caption embeddings 160 to reduce the number of similarity metric calculations that the comparator 140 performs. For example, the comparator 140 in FIG. 3 need only calculate similarity metrics for caption embeddings of the set of embeddings 346 that satisfy the filter criteria, rather than all of the caption embeddings 160 of the file repository 150. To illustrate, in the caption embedding space 220 of FIG. 3, caption embeddings 160 that satisfy the filter criteria are indicated in the caption embedding space 220 with circles (such as caption embedding 160A), and caption embeddings 160 that fail one or more of the filter criteria are illustrated with a square (such as caption embedding 160N). In this illustrative example, the comparator 140 determines a similarity metric for the caption embedding 160A and does not determine a similarity metric for the caption embedding 160N. Thus, computing resources used to determine the similarity metrics are conserved.

In the example illustrated in FIG. 3, the media search engine 130 generates the search results 124 based on similarity metrics associated with the sound captions 156. In the example of FIG. 3, the search results 124 only include results related to media files 152 associated with metadata 154 that satisfied the filter criteria applied by the filter 344.

In some alternative implementations, the filter criteria may be used to determine weights applied to the similarity metrics used to sort the search results 124. For example, in some such implementations, the comparator 140 determines similarity metrics for caption embeddings 160 associated with metadata 154 that failed to satisfy the filter criteria; however, such caption embeddings are unfavorably weighted to appear lower in the ranked search results 124 than they would had their metadata 154 satisfied the filter criteria. To illustrate, in one such implementation, the comparator 140 determines a similarity metric for the caption embedding 160N even though the metadata 154N associated with the caption embedding 160N failed to satisfy the filter criteria. In this illustrative example, the similarity metric associated with the caption embedding 160N is unfavorably weighted during sorting of the search results 124. To illustrate, in FIG. 3, the caption embedding 160A and the caption embedding 160N are approximately equidistant from the query caption embedding 210, resulting in approximately equal similarity metrics; however, a result related to the caption embedding 160N may be disposed lower in the search results 124 than a result related to the caption embedding 160A because of the unfavorable weighting.

Figure 4:
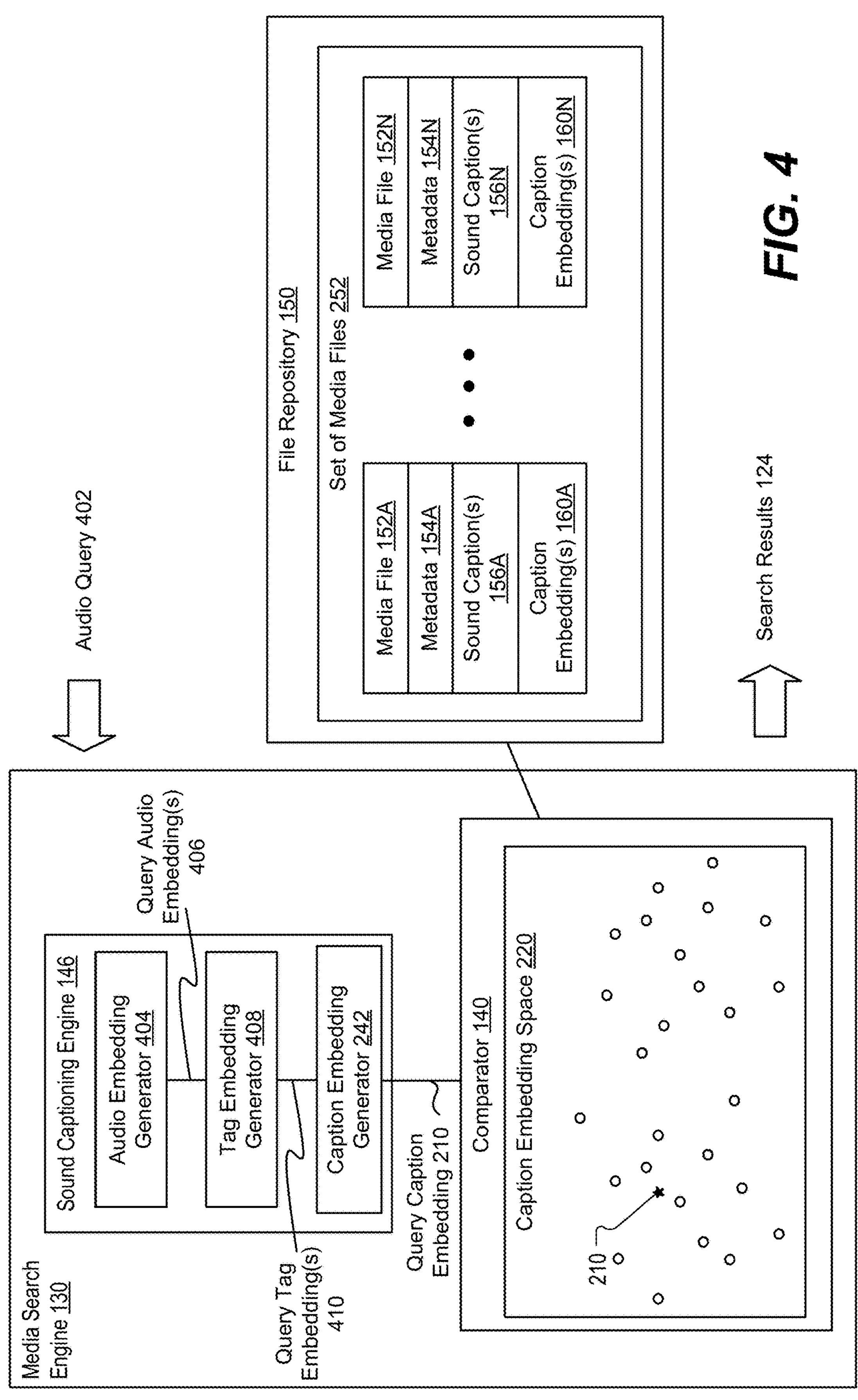
FIG. 4 is a diagram of particular aspects of the system of FIG. 1, in accordance with some examples of the present disclosure.

FIG. 4 is a diagram of particular aspects of the system of FIG. 1, in accordance with some examples of the present disclosure. In particular, FIG. 4 illustrates an example of operation of the media search engine 130 to search the file repository 150 based on an audio query 402 that includes an audio sample representing a target sound. For purposes of the example illustrated in FIG. 4, the audio query 402 includes any type of sound input (e.g., speech, non-speech sounds, environmental sounds, etc.). Further, even if the audio query 402 includes speech, the speech is treated like any other sound. For example, speech is treated in the same manner, in FIG. 4, as environmental sounds, and other non-human made sounds.

In FIG. 4, the media search engine 130 includes the sound captioning engine 146 and the comparator 140. In FIG. 4, the sound captioning engine 146 includes an audio embedding generator 404, a tag embedding generator 408, and the caption embedding generator 242. The sound captioning engine 146, as described with reference to FIG. 1, is configured to generate sound captions descriptive of sounds (e.g., sounds in the media files 152, sounds in the audio query 402, or both). In the example illustrated in FIG. 4, the sound captioning engine 146 is configured to generate one or more query caption embeddings 210 representing sound captions descriptive of sounds detected in the audio query 402. For example, the audio query 402 may include audio captured by the microphone 112 of FIG. 1 where the audio represents ambient sounds in a soundscape, such as leaves rustling or sounds of a storm. In such an example, the query sound caption(s) 210 may include "wind blowing leaves over the ground" or "heavy rain falling on a surface". One non-limiting method of training the sound captioning engine 146 is described with reference to FIG. 6.

In the example illustrated in FIG. 4, audio data of the audio query 402 is provided to the audio embedding generator 404. The audio embedding generator 404 generates one or more query audio embeddings 406 representing the audio data. For example, the audio data includes information descriptive of a waveform of the audio in the audio query 402, and the query audio embedding(s) 406 represent the audio data.

In the example illustrated in FIG. 4, the query audio embedding(s) 406 are provided as input to a tag embedding generator 408 to generate one or more query tag embeddings 410. Each of the query tag embedding(s) 410 represents a sound tag descriptive of a sound detected in the audio data. The sound tag(s) may include words or word tokens.

In the example illustrated in FIG. 4, the query tag embedding(s) 410 are provided as input to the caption embedding generator 242, which is configured to generate the query caption embedding 210 based on the query tag embedding(s) 410. The query caption embedding 210 represents a sound caption descriptive of the sound detected in the audio data. In general, the sound caption includes multiple words, such as a sequence of words forming a natural-language description of the sound.

The comparator 140 of FIG. 4 operates as described with reference to FIGS. 1-3 above. For example, the comparator 140 determines similarity metrics by comparing the query caption embedding 210 and the caption embeddings 162 in the caption embedding space 220. The search results 124 are based at least partially on the similarity metrics comparing the query caption embedding 210 and the caption embeddings 162.

Figure 5:
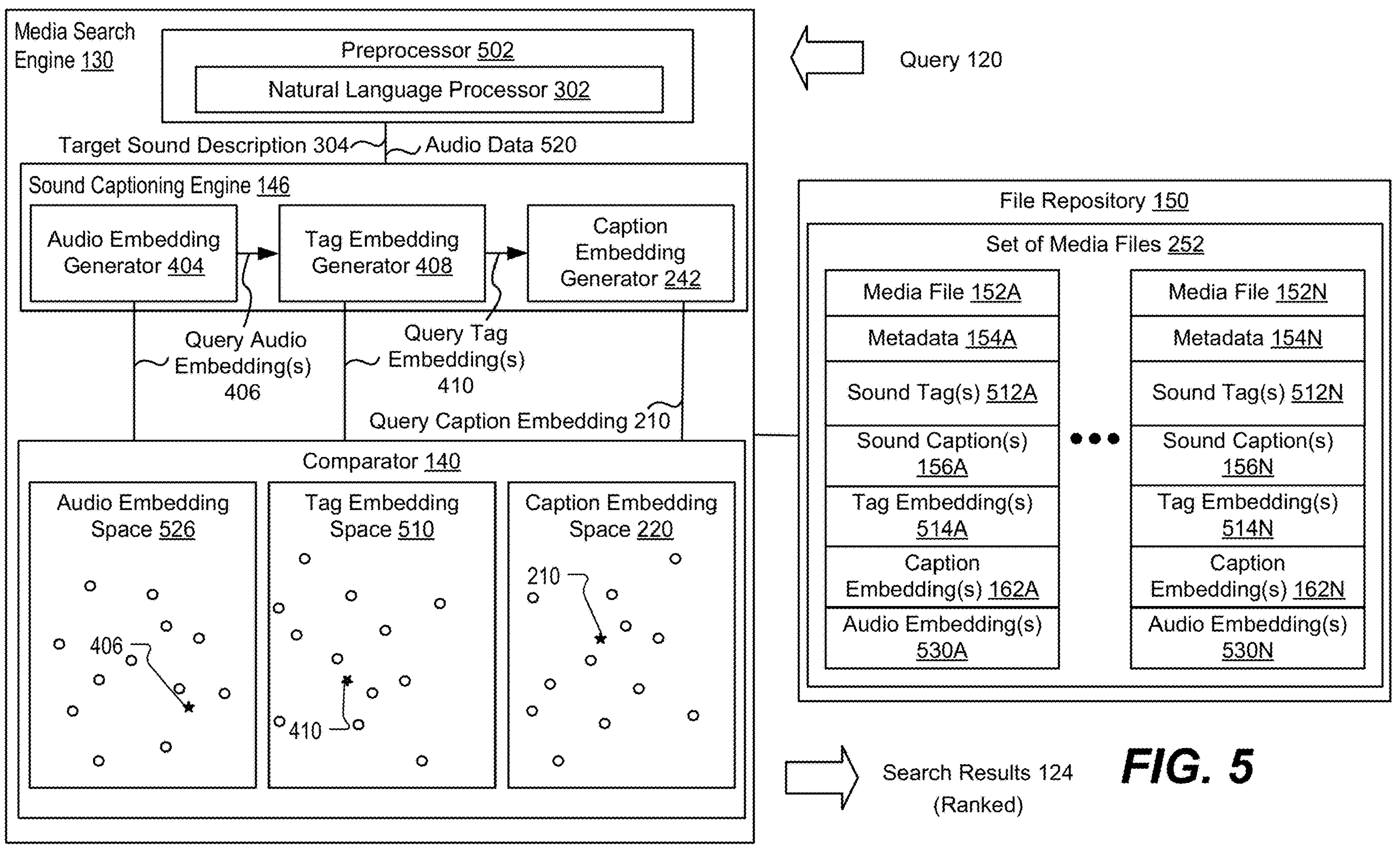
FIG. 5 is a diagram of particular aspects of the system of FIG. 1, in accordance with some examples of the present disclosure.

FIG. 5 is a diagram of particular aspects of the system of FIG. 1, in accordance with some examples of the present disclosure. In particular, FIG. 5 illustrates an example of operation of the media search engine 130 to search the file repository 150 based on the query 120 (which may include audio or text). If the query 120 includes audio, the audio can include any type of sound input (e.g., speech, non-speech sounds, environmental sounds, etc.) as described with reference to FIG. 4.

In the example illustrated in FIG. 5, the file repository 150 includes the set of media files 252, and each media file 152 is associated with metadata 154, sound caption(s) 156A, and corresponding caption embeddings 162, as described above. Further, in the example of FIG. 5, one or more of the media files 152 may optionally be associated with one or more audio embeddings 530. For example, in FIG. 5, the media search engine 130 includes the audio embedding generator 404 that is configured to generate audio embeddings for particular sounds. The audio embedding generator 404 includes one or more trained machine-learning models, such as one or more of the models described with reference to FIG. 6. The audio embedding generator 404 is operable to process the media files 152 to generate the audio embedding(s) 530 associated with one or more of the media files 152. Each audio embedding 530 represents the sound characteristics of an audio sample, such as waveform parameters descriptive of a waveform of the audio sample.

Additionally, in the example of FIG. 5, one or more of the media files 152 may optionally be associated with one or more sound tags 512 and corresponding tag embeddings 514. For example, in FIG. 5, the media search engine 130 includes the tag embedding generator 408 that is configured to generate sound tags descriptive of particular sounds. The tag embedding generator 408 includes one or more trained machine-learning models, such as one or more of the models described with reference to FIG. 6. The tag embedding generator 408 is operable to process the media files 152 to generate the sound tag(s) 512 associated with one or more of the media files 152. As explained above, a sound tag includes a word or word token descriptive of a particular sound.

During operation of the media search engine 130 of FIG. 5, a preprocessor 502 of the media search engine 130 receives the query 120 and determines whether the query includes audio or text. If the query 120 includes text, the media search engine 130 processes the text of the query 120 as described above with reference to FIG. 2. For example, in FIG. 5, the preprocessor 502 optionally includes the natural language processor 302 of FIG. 3. In this example, the natural language processor 302 may be operable to determine the target sound description 304 from text of the query 120 and to provide the target sound description 304 to the tag embedding generator 408, the caption embedding generator 242, or both. In this example, the caption embedding generator 242 generates the query caption embedding 210 based on the target sound description 304. In some implementations, the tag embedding generator 408 generates the query tag embedding(s) 410 based on the target sound description 304, and the caption embedding generator 242 generates the query caption embedding 210 based on the query tag embedding(s) 410. The comparator 140 determines similarity metrics by comparing the query caption embedding 210 and the caption embeddings 162. In this example, the search results 124 are based on the similarity metrics comparing the query caption embedding 210 and the caption embeddings 162.

In implementations in which the target sound description 304 is processed by the tag embedding generator 408 to generate the query tag embedding(s) 410, the comparator 140 may also determine similarity metrics by comparing the query tag embedding(s) 410 and the tag embeddings 514 in a tag embedding space. For example, the comparator 140 may determine a similarity metric for each tag embedding 514 based on a distance, in the tag embedding space 510, between the query tag embedding(s) 410 and the tag embedding 514. The distance may be determined, for example, as a cosine distance, a Euclidean distance, or based on some other distance measure. In some implementations, the query tag embedding(s) 410 include more than one tag embedding for each query caption embedding 210 (e.g., more than one sound tag associated with each detected sound). In some such implementations, a tag embedding 514 associated with a media file 152 may be compared to a representative query tag embedding 410 (e.g., a query tag embedding 410 that is closest to a centroid of a plurality of query tag embeddings 410). In other such implementations, a tag embedding 514 associated with a media file 152 may be compared to each query tag embedding 410 of a plurality of query tag embeddings 410, and a representative distance may be determined, such as an average distance between the tag embedding 514 and each of the plurality of query tag embeddings 410. In still other such implementations, a tag embedding 514 associated with a media file 152 may be compared to a location in the tag embedding space 510 that is representative of locations of a plurality of query tag embeddings 410, such as a centroid of the locations of a plurality of query tag embeddings 410.

If the query 120 includes audio, the media search engine 130 processes the audio of the query 120 as described above with reference to FIG. 4. For example, in FIG. 5, the preprocessor 502 provides audio data 520 based on the query 120 to the sound captioning engine 146. In this example, the sound captioning engine 146 determines the query caption embedding 210 to represent a sound caption descriptive of a sound in the audio data 520. In this example, the comparator 140 determines similarity metrics by comparing the query caption embedding 210 and the caption embeddings 162 in the caption embedding space 220. In this example, the search results 124 are based at least partially on the similarity metrics comparing the query caption embedding 210 and the caption embeddings 162.

Optionally, in the example of FIG. 5, the tag embedding generator 408 of the sound captioning engine 146 generates the query sound tag(s) 410 representing one or more sound tags descriptive of a sound in the audio data 520, as described above. For example, the sound tag(s) 512 may be generated during the process of generating the query caption embedding 210. In the example illustrated in FIG. 5, the comparator 140 may determine similarity metrics by comparing the tag embedding(s) 410 and the tag embeddings 514 in the tag embedding space 510, as described above. In this example, the search results 124 are based at least partially on the similarity metrics comparing the query tag embedding(s) 410 and the tag embeddings 514.

Optionally, in the example of FIG. 5, the audio embedding generator 404 of the sound captioning engine 146 generates the query audio embedding(s) 406 representing a sound in the audio data 520 and provides the query audio embedding(s) 406 to the comparator 140. For example, the query audio embedding(s) 406 may be generated during the process of generating the query caption embedding 210.

In the example illustrated in FIG. 5, the comparator 140 may determine similarity metrics by comparing the query audio embedding(s) 406 and the audio embeddings 530 in an audio embedding space 526. For example, the comparator 140 may determine a similarity metric for each audio embedding 530 based on a distance, in the audio embedding space 526, between the query audio embedding(s) 406 and the audio embedding 530. The distance may be determined, for example, as a cosine distance, a Euclidean distance, or based on some other distance measure. In some implementations, the query audio embedding(s) 406 include more than one audio embedding for each query caption embedding 210. In some such implementations, an audio embedding 530 associated with a media file 152 may be compared to a representative query audio embedding 406 (e.g., a query audio embedding 406 that is closest to a centroid of a plurality of query audio embeddings 406). In other such implementations, an audio embedding 530 associated with a media file 152 may be compared to each query audio embedding 406 of a plurality of query audio embeddings 406, and a representative distance may be determined, such as an average distance between the audio embedding 530 and each of the plurality of query audio embeddings 406. In still other such implementations, an audio embedding 530 associated with a media file 152 may be compared to a location in the audio embedding space 526 that is representative of locations of a plurality of query audio embeddings 406, such as a centroid of the locations of a plurality of query audio embeddings 406.

In the example illustrated in FIG. 5, the query 120 can be used to generate multiple types of embeddings, which are compared to corresponding embeddings of the file repository 150. For example, a query caption embedding 210 can be compared to the caption embeddings 162, query audio embedding(s) 406 can be compared to audio embeddings 530 associated with the media files 152, query tag embedding(s) 410 can be compared to tag embeddings 514 associated with the media files 152, or a combination thereof. In some implementations, when multiple types of embeddings are compared to corresponding embeddings of the file repository 150, each comparison may generate one or more search results. In such implementations, search results based on comparisons of different types of embeddings may be weighted differently to generate a ranked listing of the search results 124. To illustrate, to sort the search results 124 based on a ranking, a first weight may be applied to similarity values based on comparisons of the caption embeddings 162 to the query caption embedding 210, a second weight may be applied to similarity values based on comparisons of the audio embeddings 530 to the query audio embedding(s) 406, and a third weight may be applied to similarity values based on comparisons of the tag embeddings 514 to the query tag embedding(s) 410.

Figure 6:
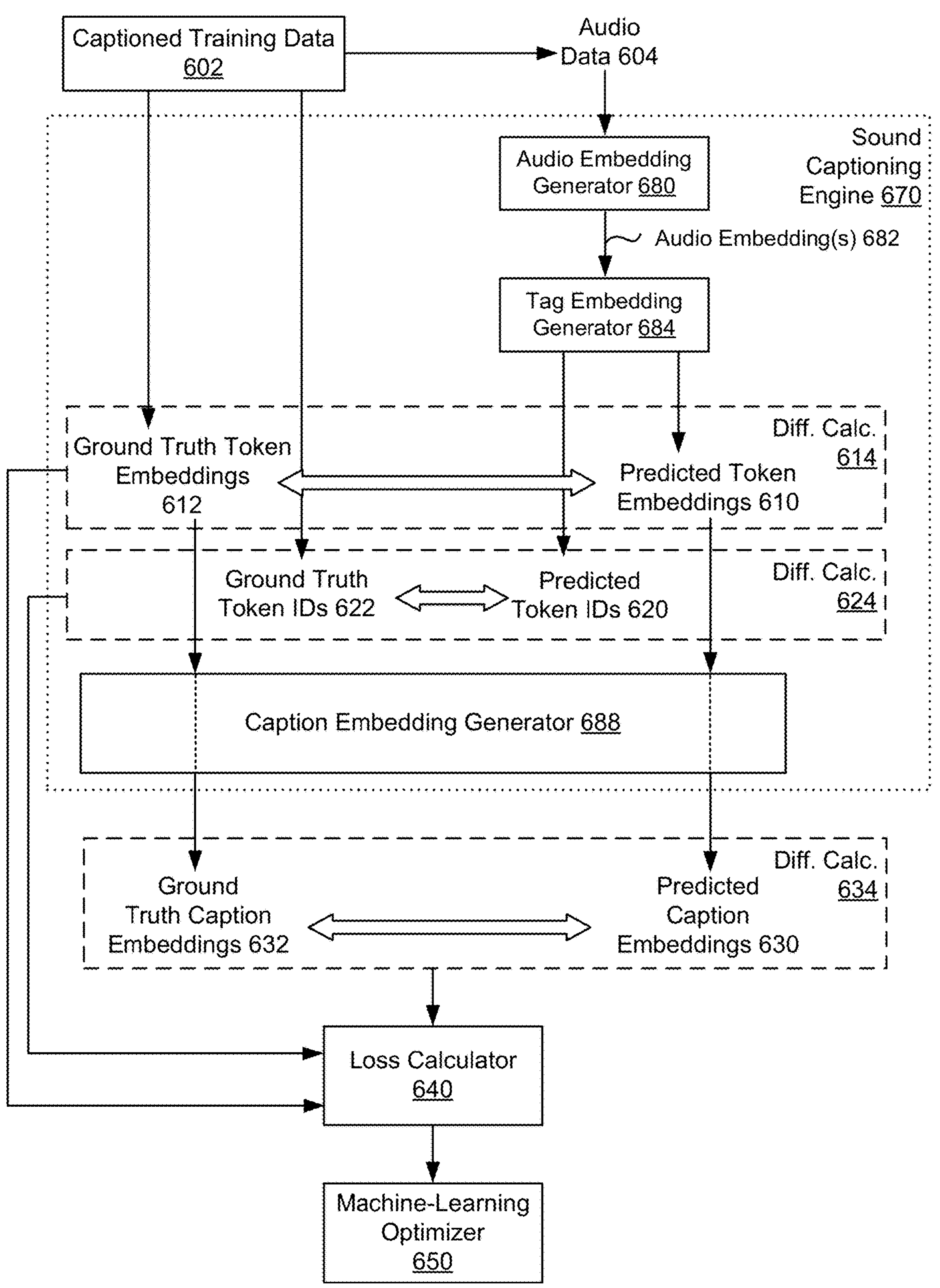
FIG. 6 is a diagram of particular aspects of training a sound captioning engine of the system of FIG. 1, in accordance with some examples of the present disclosure.

FIG. 6 is a diagram of particular aspects of training a sound captioning engine, such as the sound captioning engine 670 of the system of FIG. 1, in accordance with some examples of the present disclosure. In FIG. 6, the sound captioning engine 670 includes a plurality of machine-learning models, including an audio embedding generator 680, a tag embedding generator 684, and a caption embedding generator 688. In a particular implementation, the audio embedding generator 680, the tag embedding generator 684, and the caption embedding generator 688 represent examples of the audio embedding generator 404, the tag embedding generator 408, and the caption embedding generator 242, respectively, during a training process (e.g., before machine-learning parameters, such as link weights, of the audio embedding generator 404, the tag embedding generator 408, and the caption embedding generator 242 are fixed).

During the training process illustrated in FIG. 6, a loss calculator 640 determines a loss metric based on one or more of a plurality of difference calculations ("Diff. Calc." in FIG. 6). The training process is iterative, and during each iteration, changes in the loss metric are used to adjust machine-learning parameters of one or more of the machine-learning models of the sound captioning engine 670. For example, a machine-learning optimizer 650 may use one or more back-propagation operations (or another machine-learning optimization process) to adjust the machine-learning parameters of the machine-learning model(s) to reduce the loss metric.

The training process uses a set of captioned training data 602. The captioned training data 602 includes a large corpus of audio data samples and corresponding labels. Each audio data sample includes a representation of a particular sound, and each label associated with an audio data sample includes a description of the sound. The labels may include, for example, sound tags, sound captions, or both, that are considered to be correct. For example, each label assigned to a sound may be based on a description generated by a human after listening to the sound.

During an iteration of the training process, audio data 604 representing a sound is provided as input to the audio embedding generator 680. The audio embedding generator 680 generates one or more audio embedding(s) 682 representing the audio data 604, and the audio embedding(s) 682 are provided as input to the tag embedding generator 684. As one example, the audio embedding generator 680 includes a neural network that is configured to take a spectrogram of the audio data as input. In this example, the audio embedding generator 680 may include one or more convolutional layers (e.g., the audio embedding generator 680 may be a Convolutional Neural Network (CNN)) configured, and optionally pretrained, to process the audio data 604 to generate the audio embeddings 682.

A predicted token embedding 610 is determined based on a state or output of one or more layers of the tag embedding generator 684. In some implementations, the predicted token embedding 610 is output by a final layer of the tag embedding generator 684. In other implementations, the predicted token embedding 610 is generated based on a state of or an output of one or more hidden layers of the tag embedding generator 684. As an example, the output layer of the tag embedding generator 684 may be configured to generate a one hot vector identifying a single tag for an input audio embedding 682. In this example, the predicted token embedding 610 can include a vector of floating-point values used to generate the one hot vector. In some such implementations, the predicted token identifier 620 ("predicted token ID" in FIG. 6) corresponds to the one hot encoded vector. Each predicted token embedding 610 is a tag embedding, and each predicted token ID 620 can be mapped to a corresponding sound tag.

In some implementations, the audio embedding generator 680, the tag embedding generator 684, or both, are pretrained machine-learning models. Examples of machine-learning models that can be used as or included in the audio embedding generator 680 and the tag embedding generator 684 include PANNs; YAMNet; VGGish; and modifications of AlexNet, Inception V3, or ResNet (PANN refers to neural networks as described in the paper "Large-Scale Pretrained Audio Neural Networks for Audio Pattern Recognition" by Kong, et al. YAMNet refers to a pretrained audio event classifier available from TensorFlow Hub. VGGish is a pretrained Convolutional Neural Network available from Google. Modifications of AlexNet, Inception V3, and ResNet refer to neural networks as described in the paper "CNN ARCHITECTURES FOR LARGE-SCALE AUDIO CLASSIFICATION" by Hershey, et al.). In a particular implementation in which the audio embedding generator 680 and the tag embedding generator 684 are pretrained or trained independently of the caption embedding generator 688, the machine-learning optimizer 650 may not modify machine-learning parameters (e.g., weights) of the audio embedding generator 680 during the training process, may not modify machine-learning parameters (e.g., weights) of the tag embedding generator 684 during the training process, or both. Alternatively, the pretrained audio embedding generator 680 and the tag embedding generator 684 may be used as a starting point for further training, in which case the machine-learning optimizer 650 may further optimize (e.g., modify) the machine-learning parameters (e.g., weights) of the audio embedding generator 680, the tag embedding generator 684, or both, during the training process illustrated in FIG. 6.

Figure 7:
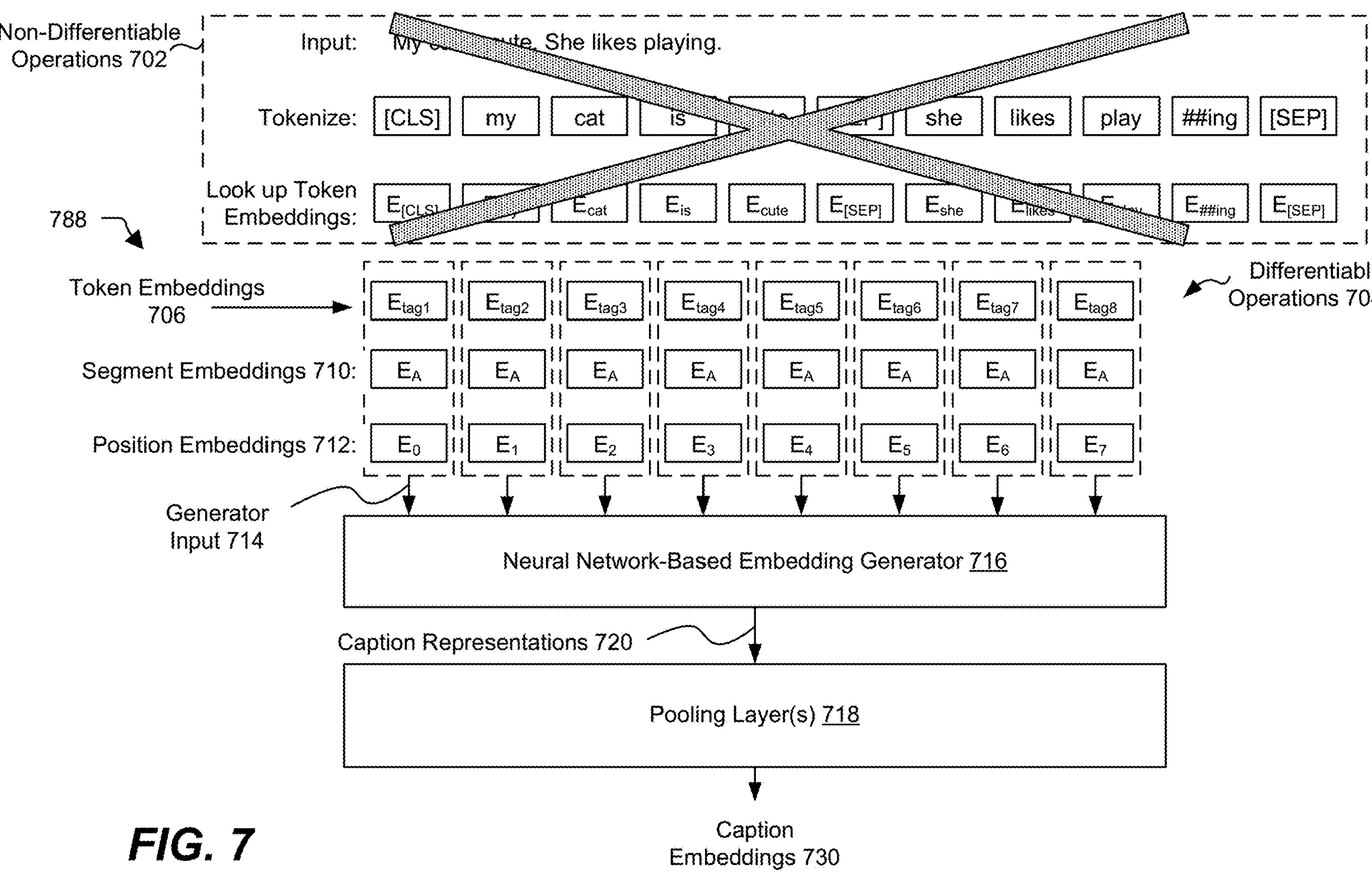
FIG. 7 is a diagram of particular aspects of a sound captioning engine of the system of FIG. 1, in accordance with some examples of the present disclosure.

In the example illustrated in FIG. 6, the predicted token embeddings 610 are provided as input to the caption embedding generator 688. The caption embedding generator 688 generates a predicted caption embedding 630 based on a set of one or more predicted token embeddings 610. In a particular implementation, the caption embedding generator 688 is a multi-head self-attention network, such as a transformer network (such as Sentence-Bert). FIG. 7 shows one example of using a transformer-based embedding generator as part of the caption embedding generator 630.

The loss calculator determines a loss metric based on a difference calculation 634. In some implementations, the loss metric is further based on either or both of a difference calculation 614 and a difference calculation 624. The difference calculation 614 is based on a comparison of a predicted token embedding 610 and a ground truth token embedding 612 for the same sound. In the context of training, "ground truth" indicates that a value or parameter (e.g., a label) is human assigned or otherwise validated sufficiently to be considered reliable. In the example illustrated in FIG. 6, the ground truth token embedding 612 for each sound may be indicated in the captioned training data 602. In a particular implementation, the loss metric may be determined at least partially based on a similarity metric indicating similarity of the ground truth token embedding 612 for a sound and the predicted token embedding 610 for the sound. To illustrate, the similarity metric may be determined as a cosine distance between the ground truth token embedding 612 for a sound and the predicted token embedding 610.

The difference calculation 624 is based on a comparison of a predicted token identifier 620 and a ground truth token identifier 622 for a particular sound. In the example illustrated in FIG. 6, the ground truth token identifier 622 for each sound may be indicated in the captioned training data 602. In a particular implementation, the loss metric may be determined at least partially based on a similarity metric indicating similarity of the ground truth token identifier 622 for a sound and the predicted token identifier 620 for the sound. To illustrate, the similarity metric may be determined as a cross-entropy loss between the ground truth token identifier 622 for a sound and the predicted token identifier 620.

The difference calculation 634 is based on a comparison of a predicted caption embedding 630 and a ground truth caption embedding 632 for a particular sound. In the example illustrated in FIG. 6, the ground truth caption embedding 632 for each sound may be determined by the caption embedding generator 688 based on the ground truth token embeddings 612 for the particular sound. In other implementations, the ground truth caption embedding 632 for each sound may be indicated in the captioned training data 602. In a particular implementation, the loss metric may be determined at least partially based on a similarity metric indicating similarity of the ground truth caption embedding 632 for a sound and the predicted caption embedding 630 for the sound. To illustrate, the similarity metric may be determined as a cosine distance between the ground truth caption embedding 632 for a sound and the predicted caption embedding 630 for the sound.

The machine-learning optimizer 650 is operable to modify machine-learning parameters (e.g., weights) of the audio embedding generator 680, the tag embedding generator 684, the caption embedding generator 688, or a combination thereof, to reduce the loss metric. In some implementations, the audio embedding generator 680 is pretrained and static, and the machine-learning optimizer 650 is operable to modify machine-learning parameters (e.g., weights) of the tag embedding generator 684, the caption embedding generator 688, or both, to reduce the loss metric. In some implementations, as described with reference to FIG. 7, the audio embedding generator 680, the tag embedding generator 684, and the caption embedding generator 688 are selected to be differentiable to enable the use of backpropagation to modify (e.g., train or fine-tune) machine-learning parameters (e.g., weights) of each based on the loss metric.

As one specific, non-limiting, example, a PANN machine-learning model can be used as the audio embedding generator 680 and a stacked arrangement of two transformer decoder layers with four heads and gelu activation can be used as the tag embedding generator 684. In this example, the tag embedding generator 684 may be trained to generate word/token embeddings (e.g., the predicted token embeddings 610) that are provided to the caption embedding generator 688. The word/token embeddings are further projected into a space whose dimension is equal to the size of the vocabulary, so that the prediction can be expressed as a one-hot encoded vector (e.g., as a predicted token identifier 620 corresponding to each predicted token embedding 610).

For example, the predicted token identifiers 620 may be based on 128-dimensional word2vecs.

The loss calculator 640 attempts to reduce (e.g., minimize) the cross-entropy loss between the one-hot encoded vectors of the ground truth token identifiers 622 and corresponding predicted token identifiers 620. Training to make the word/token embeddings (e.g., the predicted token embeddings 610) more accurate can be improved by also configuring the loss calculator 640 to determine the loss metric partially based on the cosine distance between word/token embeddings (e.g., the ground truth token embeddings 612 and corresponding predicted token embeddings 610).

Because the sentence embedding can represent the gist (e.g., semantic and syntactic content) of multiple tags, the loss calculator 640 can also be configured to determine the loss metric based at least partially on the cosine similarity between the ground truth caption embeddings 632 and corresponding predicted caption embeddings 630.

Further, appending the caption embedding generator 688 to the tag embedding generator 684 allows the machine-learning optimizer 650 to directly update the machine-learning parameters of the tag embedding generator 684, the caption embedding generator 688, or both, via backpropagation. For example, while training the tag embedding generator 684, the predicted token embeddings 610 generated by the tag embedding generator 684 are directly fed into the caption embedding generator 688, and the difference calculation 634 is used to update weights of the tag embedding generator 684. Hence, the weights of the tag embedding generator 684 can be directly optimized to reduce (e.g., minimize) the distance between the caption embeddings 630, 632, and to consequently make the generated captions closer in meaning to the reference caption.

In some implementations, Sentence-BERT is used as the caption embedding generator 688 and is configured or trained to distinguish whether two sentences are in entailment of, in contradiction to, or neutral with respect to each other. In this example, the tag embedding generator 684 is also a BERT network so that the predicted token embeddings 610 generated by the tag embedding generator 684 can be directly input into the caption embedding generator 688 (e.g., Sentence-BERT) to enable end-to-end backpropagation. In other implementations, other machine-learning models are used instead of or in addition to Sentence-BERT. For example, word2vec or FastText can be used as the caption embedding generator 688.

FIG. 7 is a diagram of particular aspects of a sound captioning engine of the system of FIG. 1, in accordance with some examples of the present disclosure. In particular, FIG. 7 illustrates one example of a caption embedding generator 788. During training, the caption embedding generator 788 corresponds to one example of the caption embedding generator 688 of FIG. 6. During use (e.g., after training and during inference), the caption embedding generator 788 corresponds to one example of the caption embedding generator 242 of any of FIGS. 2-5.

In the example illustrated in FIG. 7, the caption embedding generator 788 uses a neural network-based embedding generator 716 (e.g., a BERT network, another multi-head attention-based network, a word2vec network, a FastText network, etc.) and one or more pooling layers 718. However, in contrast to conventional language processing models, the neural network-based embedding generator 716 is configured to receive input (e.g., generator input 714) that is based on the token embeddings 706 output by a tag embedding generator (e.g., the tag embedding generator 408 of FIG. 4 or FIG. 5, or the tag embedding generator 684 of FIG. 6), as a result, all operations of the caption embedding generator 788 are differentiable, which enables backpropagation training of each of the machine-learning models of the sound captioning engine 670 of FIG. 6.

For example, conventional language processing models include non-differentiable operations 702 to prepare input for a neural network (e.g., a BERT model). As illustrated in FIG. 7, examples of such non-differentiable operations 702 include tokenization of input and/or look up operations to determine token embeddings based on the input tokens. Omitting the non-differentiable operations 702 enables concurrent backpropagation training of weights of all of the machine-learning models of a sound captioning engine (e.g., the sound captioning engine 146 of FIGS. 1-5 or the sound captioning engine 670 of FIG. 6) or any subset thereof. For example, referring to FIG. 6, the machine-learning optimizer 650 can use backpropagation to train or fine tune weights of the audio embedding generator 680, the tag embedding generator 684, and/or the caption embedding generator 688 to minimize a loss function that is based on the difference calculation 634. This arrangement has the added benefit of using a loss function that directly represents a metric of interest (e.g., how closely captions generated by the sound captioning engine match captions that would be assigned by a human). Further, training using a loss function that is based on the caption embeddings (e.g., the difference calculation 634) enables optimizing for semantic similarity of captions rather than identical caption language. For example, instead of using caption embeddings, the loss function used for training could use the predicted captions (or the predicted tags that are represented by the difference calculation 624). In this situation, the objective would be to minimize cross-entropy loss of one-hot vectors, which encourages generation of predicted captions or tags that are identical to the ground truth captions or tags (e.g., are represented by the ground truth token IDs 622 or one hot encodings based on the ground truth caption embeddings 632). However, a loss function based on tag embeddings (e.g., the difference calculation 614) and/or caption embeddings (e.g., the difference calculation 634) can be used to minimize distance in an embedding space, which effectively translates into increasing semantic similarity between the predicted captions and the ground truth captions, between the predicted tags and the ground truth tags, or both.

In the example illustrated in FIG. 7, the non-differentiable operations 702 are omitted and only differentiable operations 704 are used. For example, the generator input 714 is based on token embeddings 706 generated by a tag embedding generator (e.g., the tag embedding generator 408 of FIG. 4 or FIG. 5, or the tag embedding generator 684 of FIG. 6), avoiding tokenization and embedding look up operations. In the example illustrated in FIG. 7, the generator input 714 to the neural network-based embedding generator 716 may also include segment embeddings 710 and position embeddings 712.

In the example illustrated in FIG. 7, the neural network-based embedding generator 716 generates caption representations 720 based on the generator input 714. The caption representations 720 are aggregated by the pooling layer(s) 718 to generate caption embeddings 730. In some implementations, the caption representations 720 correspond to output from a final layer of the neural network-based embedding generator 716. In other implementations, the caption representations 720 correspond to an output or state of one or more hidden layers of the neural network-based embedding generator 716. The caption embeddings 730 correspond to or include examples of any of the caption embeddings 160 of FIGS. 1-5, the query caption embeddings 210 of FIGS. 2-5, the ground truth caption embeddings 632 of FIG. 6, or the predicted caption embeddings 630 of FIG. 6.

Figure 8:
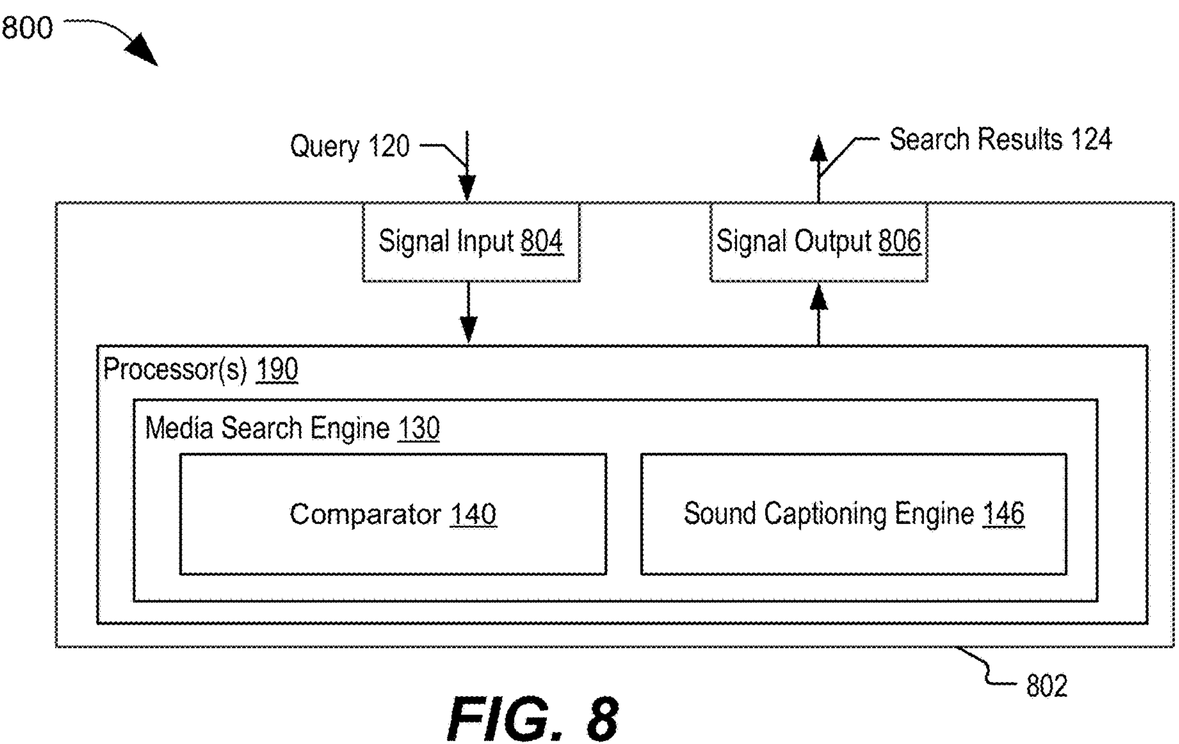
FIG. 8 illustrates an example of an integrated circuit operable to search media files for sounds, in accordance with some examples of the present disclosure.
Figure 12:
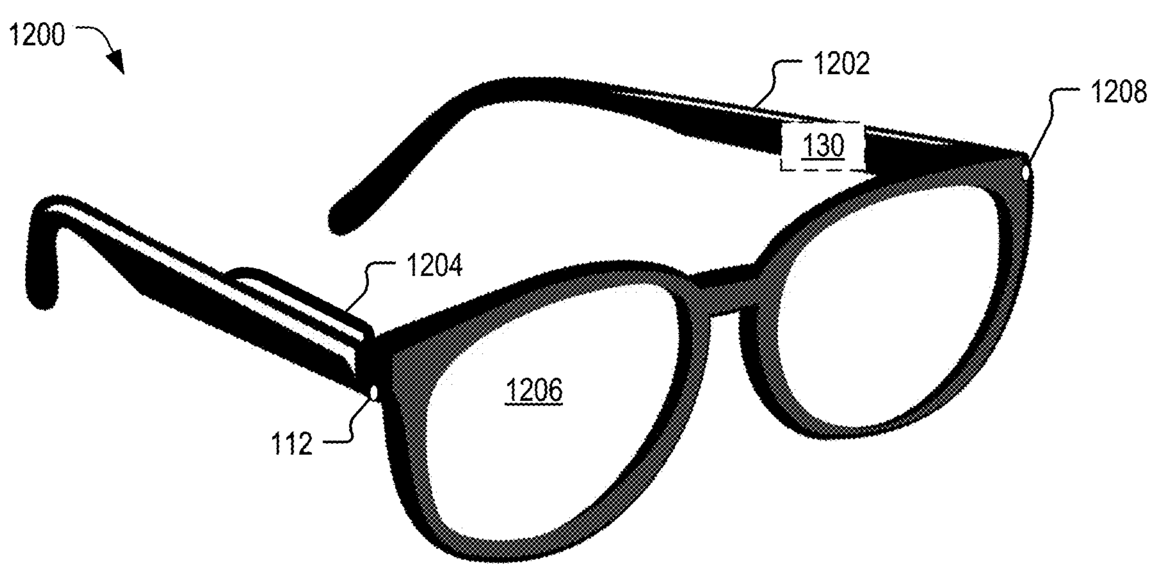
FIG. 12 is a diagram of a mixed reality or augmented reality glasses device operable to search media files for sounds, in accordance with some examples of the present disclosure.
Figure 13:
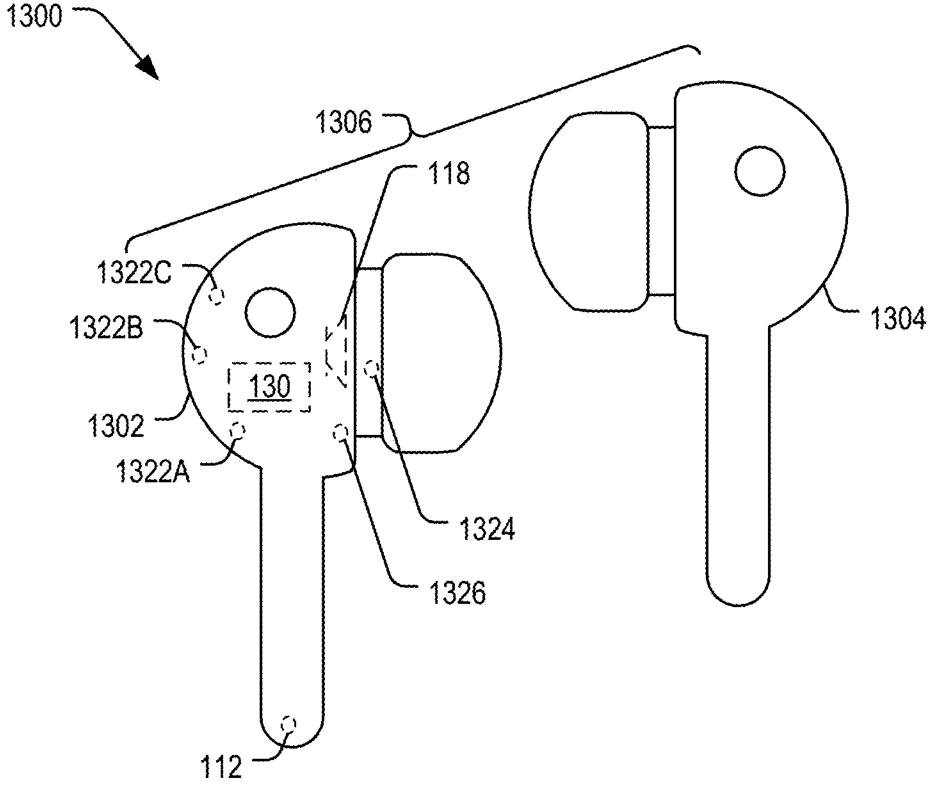
FIG. 13 is a diagram of earbuds operable to search media files for sounds, in accordance with some examples of the present disclosure.
Figure 14:
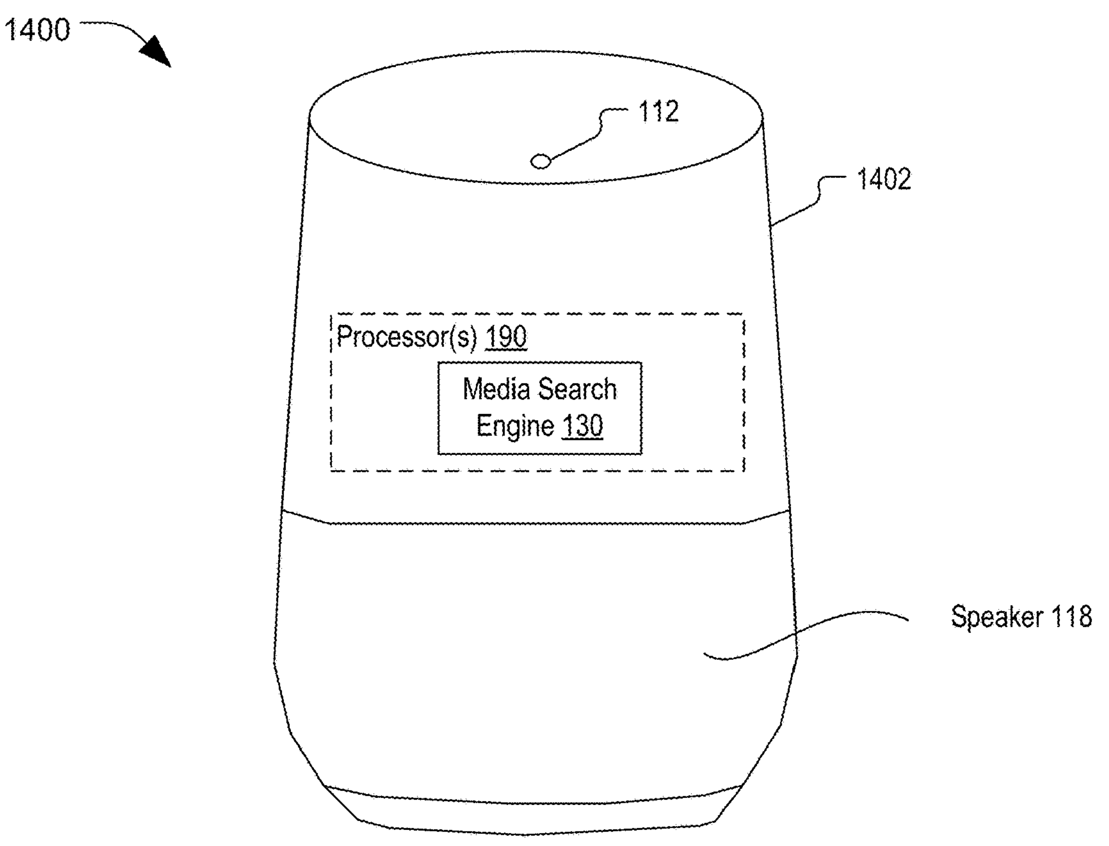
FIG. 14 is a diagram of a voice-controlled speaker system operable to search media files for sounds, in accordance with some examples of the present disclosure.
Figure 15:
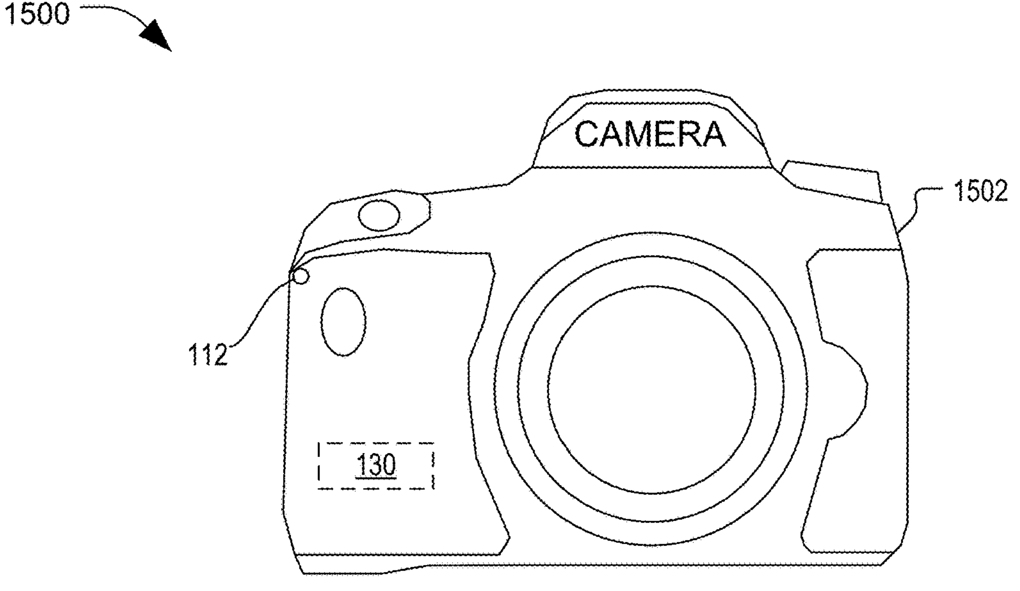
FIG. 15 is a diagram of a camera operable to search media files for sounds, in accordance with some examples of the present disclosure.
Figure 16:
FIG. 16 is a diagram of a headset, such as a virtual reality, mixed reality, or augmented reality headset, operable to search media files for sounds, in accordance with some examples of the present disclosure.
Figure 16:
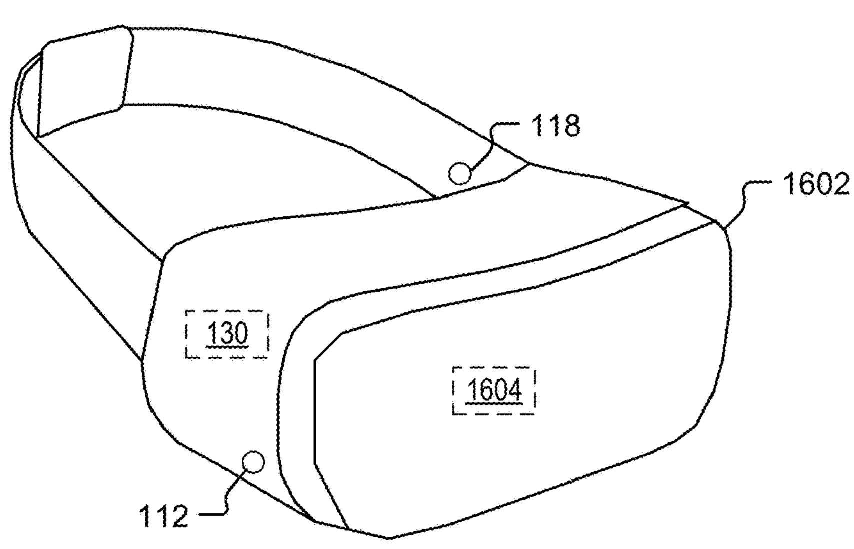
Figure 17:
FIG. 17 is a diagram of a first example of a vehicle operable to search media files for sounds, in accordance with some examples of the present disclosure.
Figure 17:
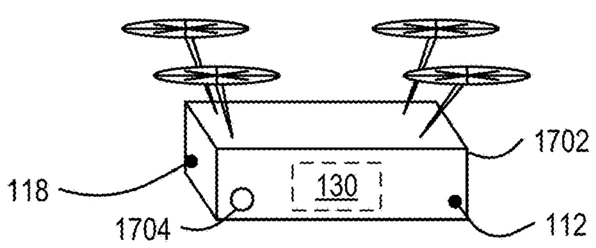
Figure 18:
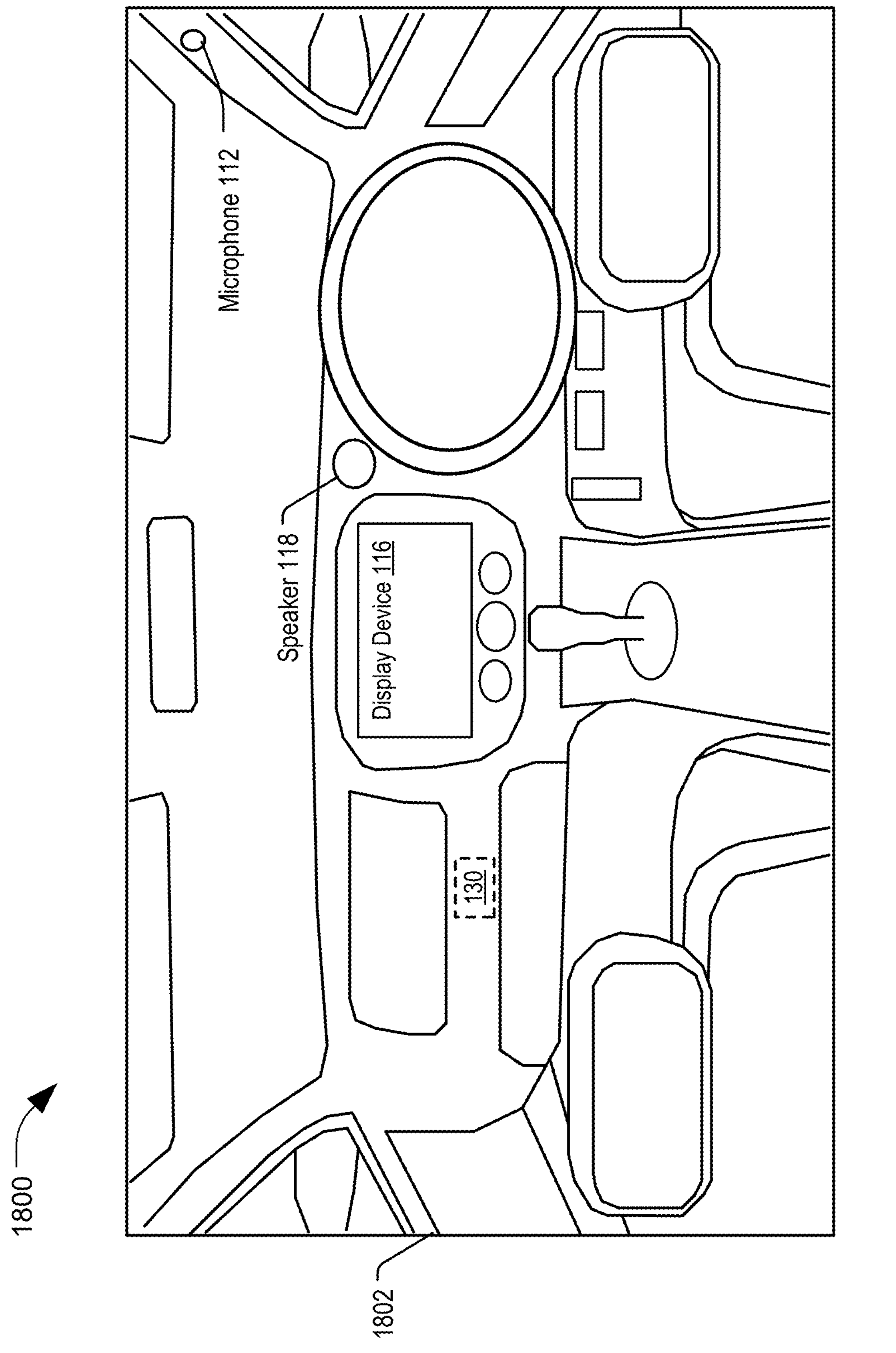
FIG. 18 is a diagram of a second example of a vehicle operable to search media files for sounds, in accordance with some examples of the present disclosure.

FIG. 8 depicts an implementation 800 of the device 102 as an integrated circuit 802 that includes the one or more processors 190. The integrated circuit 802 includes a signal input 804, such as one or more bus interfaces, to enable the query 120 to be received for processing. The integrated circuit 802 also includes a signal output 806, such as a bus interface, to enable sending of an output signal, such as the output representing the search results 124. In the example illustrated in FIG. 8, the processor(s) 190 include the comparator 140 and the sound captioning engine 146. The integrated circuit 802 enables implementation of operations to search for sounds in media content. The integrated circuit 802 can be integrated within one or more other devices, such as a mobile phone or tablet as depicted in FIG. 9, a headset as depicted in FIG. 10, a wearable electronic device as depicted in FIG. 11, a mixed reality or augmented reality glasses device as depicted in FIG. 12, earbuds as depicted in FIG. 13, a voice-controlled speaker system as depicted in FIG. 14, a camera as depicted in FIG. 15, a virtual reality, mixed reality, or augmented reality headset as depicted in FIG. 16, or a vehicle as depicted in FIG. 17 or FIG. 18, to enable such other devices to search for sounds in media content.

Figure 9:
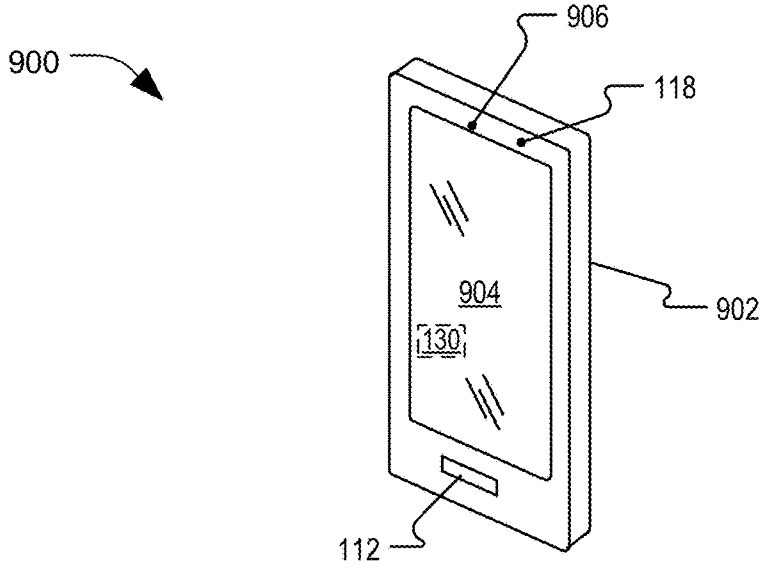
FIG. 9 is a diagram of a mobile device operable to search media files for sounds, in accordance with some examples of the present disclosure.

FIG. 9 depicts an implementation 900 in which the device 102 includes a mobile device 902, such as a phone or tablet, as illustrative, non-limiting examples. The mobile device 902 includes the microphone 112, the camera 906, and a display screen 904. Components of the processor(s) 190, including the media search engine 130, are integrated in the mobile device 902 and are illustrated using dashed lines to indicate internal components that are not generally visible to a user of the mobile device 902. In a particular example, the media search engine 130 is operable to search user generated media content, downloaded media content, and/or other media content that is stored in an onboard memory of the mobile device 902 or stored at a remote memory, such as at a server or a cloud-based file repository. For example, a user can provide a query (e.g., query 120 of FIG. 1) by entering text via a touchscreen of the mobile device 902, by providing speech descriptive of a target sound via the microphone 112, or by capturing a target sound via the microphone 112. In this example, the media search engine 130 performs one or more of the search operations described with reference to FIGS. 1-5 to generate search results based on the query. The search results may be provided to the user on the display screen 904 or as sound output to the speaker 118.

Figure 10:
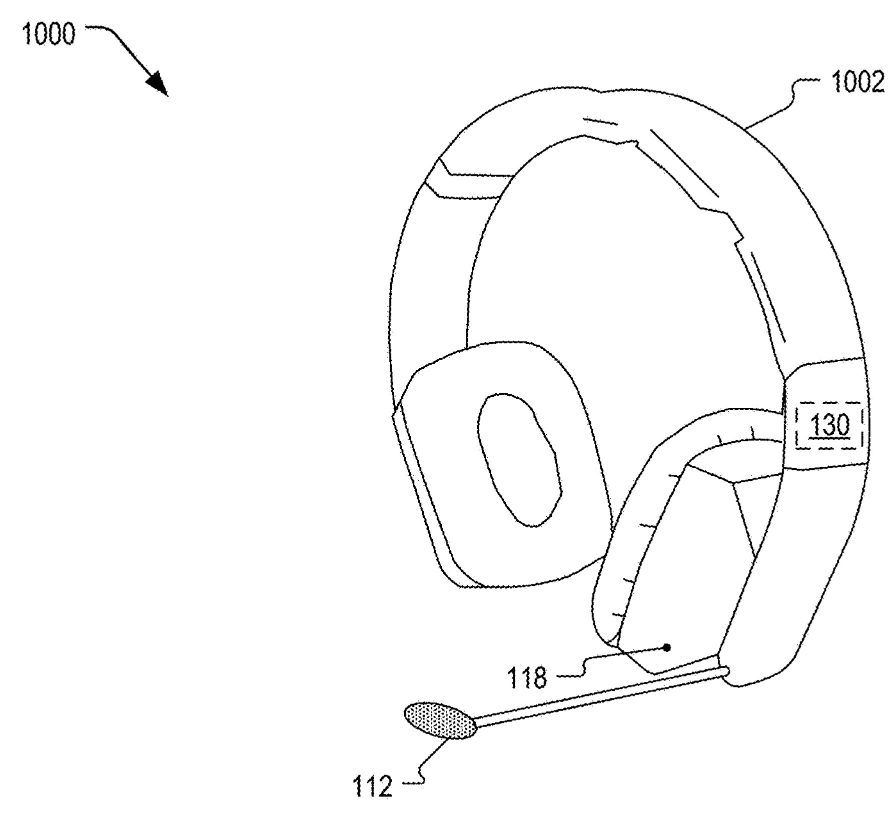
FIG. 10 is a diagram of a headset operable to search media files for sounds, in accordance with some examples of the present disclosure.

FIG. 10 depicts an implementation 1000 in which the device 102 includes a headset device 1002. The headset device 1002 includes the microphone 112. Components of the processor(s) 190, including the media search engine 130, are integrated in the headset device 1002. In a particular example, the media search engine 130 is operable to search user generated media content, downloaded media content, and/or other media content that is stored in an onboard memory of the headset device 1002 or stored at a remote memory, such as at a mobile device, a game system, a computer, a server, or a cloud-based file repository accessible to the headset device 1002. For example, a user can provide a query (e.g., query 120 of FIG. 1) by providing speech descriptive of a target sound via the microphone 112, or by capturing a target sound via the microphone 112. In this example, the media search engine 130 performs one or more of the search operations described with reference to FIGS. 1-5 to generate search results based on the query. The search results may be provided to the user on a display of a computing device or as sound output to the speaker 118.

Figure 11:
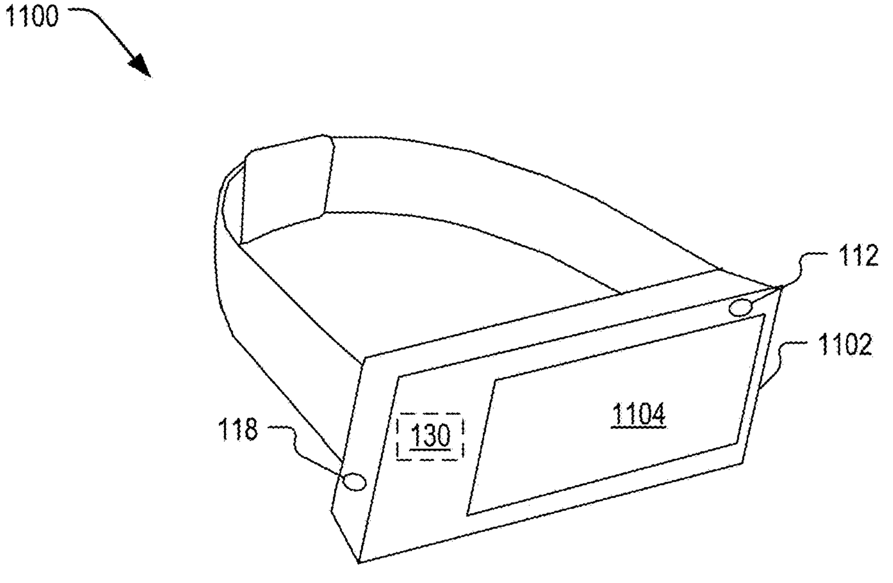
FIG. 11 is a diagram of a wearable electronic device operable to search media files for sounds, in accordance with some examples of the present disclosure.

FIG. 11 depicts an implementation 1100 in which the device 102 includes a wearable electronic device 1102, illustrated as a "smart watch." The wearable electronic device 1102 includes the processor(s) 190 and a display screen 1104. Components of the processor(s) 190, including the media search engine 130, are integrated in the wearable electronic device 1102. In a particular example, the media search engine 130 is operable to search user generated media content, downloaded media content, and/or other media content that is stored in an onboard memory of the wearable electronic device 1102 or stored at a remote memory, such as at a mobile device, a game system, a computer, a server, or a cloud-based file repository accessible to the wearable electronic device 1102. For example, a user can provide a query (e.g., query 120 of FIG. 1) by entering text via the display screen 1104, by providing speech descriptive of a target sound via the microphone 112, or by capturing a target sound via the microphone 112. In this example, the media search engine 130 performs one or more of the search operations described with reference to FIGS. 1-5 to generate search results based on the query. The search results may be provided to the user on the display screen 1104 or as sound output to the speaker 118.

FIG. 12 depicts an implementation 1200 in which the device 102 includes a portable electronic device that corresponds to augmented reality or mixed reality glasses 1202. The glasses 1202 include a holographic projection unit 1204 configured to project visual data onto a surface of a lens 1206 or to reflect the visual data off of a surface of the lens 1206 and onto the wearer's retina. Components of the processor(s) 190, including the media search engine 130, are integrated in the glasses 1202. In a particular example, the media search engine 130 is operable to search user generated media content, downloaded media content, and/or other media content that is stored in an onboard memory of the glasses 1202 or stored at a remote memory, such as at a mobile device, a game system, a computer, a server, or a cloud-based file repository accessible to the glasses 1202. For example, a user can provide a query (e.g., query 120 of FIG. 1) by providing speech descriptive of a target sound via the microphone 112, or by capturing a target sound via the microphone 112. In this example, the media search engine 130 performs one or more of the search operations described with reference to FIGS. 1-5 to generate search results based on the query. The search results may be provided to the user via projection onto the lens 1206 or as sound output to a speaker.

FIG. 13 depicts an implementation 1300 in which the device 102 includes a portable electronic device that corresponds to a pair of earbuds 1306 that includes a first earbud 1302 and a second earbud 1304. Although earbuds are described, it should be understood that the present technology can be applied to other in-ear or over-ear playback devices.

The first earbud 1302 includes the microphone 112, which in FIG. 13 may include a high signal-to-noise microphone positioned to capture the voice of a wearer of the first earbud 1302, an array of one or more other microphones configured to detect ambient sounds and spatially distributed to support beamforming, illustrated as microphones 1322A, 1322B, and 1322C, an "inner" microphone 1324 proximate to the wearer's ear canal (e.g., to assist with active noise cancelling), and a self-speech microphone 1326, such as a bone conduction microphone configured to convert sound vibrations of the wearer's ear bone or skull into an audio signal.

The second earbud 1304 can be configured in a substantially similar manner as the first earbud 1302.

In FIG. 13, components of the processor(s) 190, including the media search engine 130, are integrated into one or both of the earbuds 1306. In a particular example, the media search engine 130 is operable to search user generated media content, downloaded media content, and/or other media content that is stored in an onboard memory of the earbuds 1306 or stored at a remote memory, such as at a mobile device, a game system, a computer, a server, or a cloud-based file repository accessible to the earbuds 1306. For example, a user can provide a query (e.g., query 120 of FIG. 1) by providing speech descriptive of a target sound via the microphone 112, or by capturing a target sound via the microphone 112 or one or more of the microphones 1322. In this example, the media search engine 130 performs one or more of the search operations described with reference to FIGS. 1-5 to generate search results based on the query. The search results may be provided to the user as sound output to the speaker 118.

FIG. 14 is an implementation 1400 in which the device 102 includes a wireless speaker and voice activated device 1402. The wireless speaker and voice activated device 1402 can have wireless network connectivity and is configured to execute an assistant operation. The wireless speaker and voice activated device 1402 of FIG. 14 includes the processor(s) 190, which include the media search engine 130. Additionally, the wireless speaker and voice activated device 1402 includes the microphone 112 and the speaker 118. During operation, in response to receiving a query (e.g., the query 120 of FIG. 1), the media search engine 130 searches user generated media content, downloaded media content, and/or other media content that is stored in an onboard memory of the wireless speaker and voice activated device 1402 or stored at a remote memory, such as at a mobile device, a game system, a computer, a server, or a cloud-based file repository accessible to the wireless speaker and voice activated device 1402. For example, a user can provide a query (e.g., query 120 of FIG. 1) by providing speech descriptive of a target sound via the microphone 112 or by capturing a target sound via the microphone 112. In this example, the media search engine 130 performs one or more of the search operations described with reference to FIGS. 1-5 to generate search results based on the query. The search results may be provided to the user as sound output to the speaker 118.

FIG. 15 depicts an implementation 1500 in which the device 102 is integrated into or includes a portable electronic device that corresponds to a camera 1502. In FIG. 15, the camera 1502 includes the microphone 112. Additionally, components of the processor(s) 190, including the media search engine 130, may be integrated into the camera 1502. In a particular example, the media search engine 130 is operable to search user generated media content, downloaded media content, and/or other media content that is stored in an onboard memory of the camera 1502 or stored at a remote memory, such as at a mobile device, a game system, a computer, a server, or a cloud-based file repository accessible to the camera 1502. For example, a user can provide a query (e.g., query 120 of FIG. 1) by providing speech descriptive of a target sound via the microphone 112 or by capturing a target sound via the microphone 112. In this example, the media search engine 130 performs one or more of the search operations described with reference to FIGS. 1-5 to generate search results based on the query. The search results may be provided to the user via a viewscreen (disposed, for example, on a backside of the camera 1502).

FIG. 16 depicts an implementation 1600 in which the device 102 includes a portable electronic device that corresponds to an extended reality headset 1602 (e.g., a virtual reality headset, a mixed reality headset, an augmented reality headset, or a combination thereof). The extended reality headset 1602 includes the microphone 112 and the speaker 118. In a particular aspect, a visual interface device 1604 is positioned in front of the user's eyes to enable display of augmented reality, mixed reality, or virtual reality images or scenes to the user while the extended reality headset 1602 is worn. In a particular example, the visual interface device 1604 is configured to display a notification indicating user speech detected in the audio signal from the microphone 112. In a particular implementation, components of the processor(s) 190, including the media search engine 130, are integrated in the extended reality headset 1602. In a particular example, the media search engine 130 is operable to search user generated media content, downloaded media content, and/or other media content that is stored in an onboard memory of the extended reality headset 1602 or stored at a remote memory, such as at a mobile device, a game system, a computer, a server, or a cloud-based file repository accessible to the extended reality headset 1602. For example, a user can provide a query (e.g., query 120 of FIG. 1) by providing speech descriptive of a target sound via the microphone 112, or by capturing a target sound via the microphone 112. In this example, the media search engine 130 performs one or more of the search operations described with reference to FIGS. 1-5 to generate search results based on the query. The search results may be provided to the user via the visual interface device 1604 or as sound output to the speaker 118.

FIG. 17 depicts an implementation 1700 in which the device 102 corresponds to, or is integrated within, a vehicle 1702, illustrated as a manned or unmanned aerial device (e.g., a package delivery drone). The microphone 112 and the speaker 118 are integrated into the vehicle 1702. The vehicle 1702 may also include one or more cameras 1704. In a particular implementation, components of the processor(s) 190, such as the media search engine 130, are also integrated in the vehicle 1702. During operation, the microphone 112 may generate an input media stream which can be stored as a media file in a file repository (e.g., one of the media files 152 of the file repository 150 of FIG. 1) or used as a media search query (e.g., the query 120). For example, audio captured by the microphone 112 can be provided as a target sound of a query to determine whether the audio matches a previously recorded sound (such as a gunshot sound, a siren sound, an automobile collision sound, etc.). In this example, the media search engine 130 performs one or more of the search operations described with reference to FIGS. 1-5 to generate search results based on the query. The search results may be used to determine a subsequent action performed by the vehicle 1702, such as reporting detection of a particular sound to a monitoring station.

FIG. 18 depicts another implementation 1800 in which the device 102 corresponds to, or is integrated within, a vehicle 1802, illustrated as a car. The vehicle 1802 includes the processor(s) 190, which include the media search engine 130. The vehicle 1802 also includes the microphone 112, the speaker 118, and the display device 116. The microphone 112 is positioned to capture utterances of an operator of the vehicle 1802 or a passenger of the vehicle 1802. During operation, a user may provide a query via the display device 116 of the microphone 112 to initiate a search of media content. In response to receiving a query (e.g., the query 120 of FIG. 1), the media search engine 130 searches user generated media content, downloaded media content, and/or other media content that is stored in an onboard memory of the vehicle 1802 or stored at another memory that is accessible to the vehicle 1802, such as a memory of a mobile device in the vehicle 1802, or a memory at a server or a cloud-based file repository accessible to the vehicle 1802. In this example, the media search engine 130 performs one or more of the search operations described with reference to FIGS. 1-5 to generate search results based on the query. The search results may be provided to the user via the display device 116 or as sound output to the speaker 118.

Figure 19:
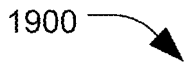
FIG. 19 is a diagram of a particular implementation of a method of searching media files for sounds that may be performed by the device of FIG. 1, in accordance with some examples of the present disclosure.
Figure 19:
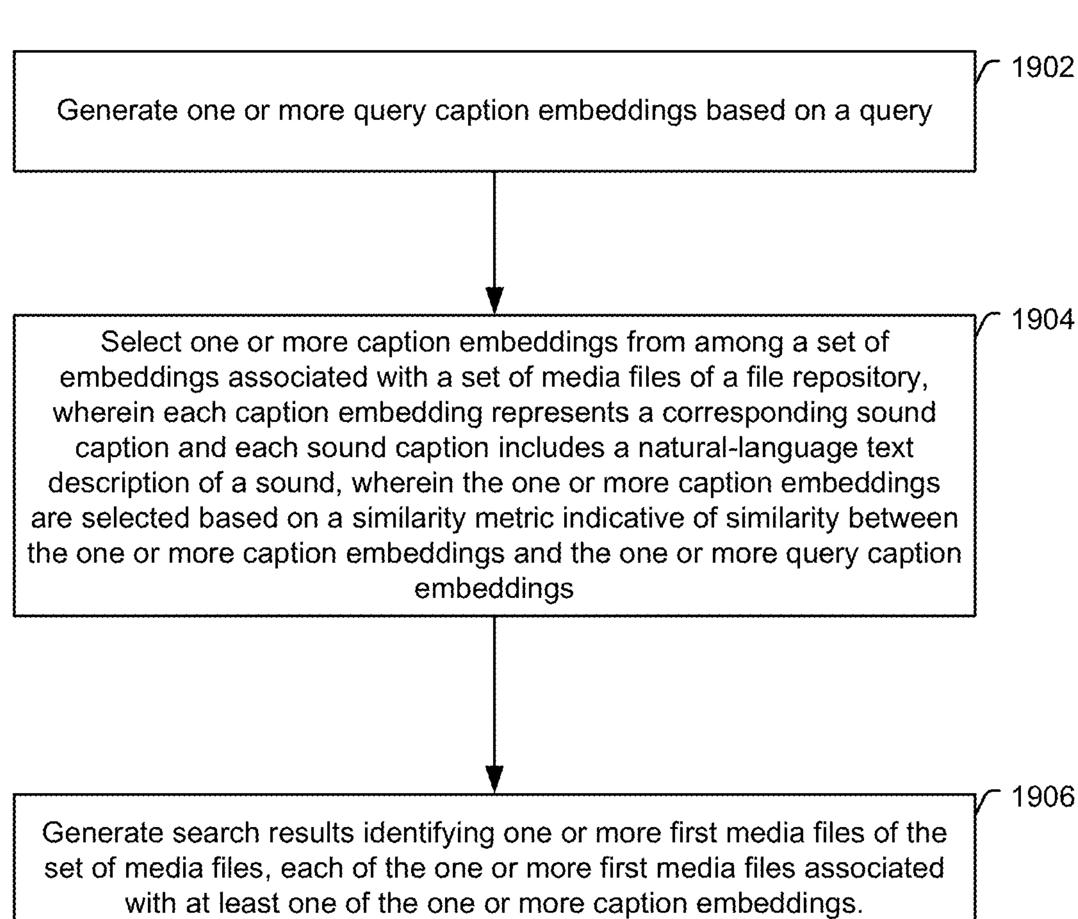

Referring to FIG. 19, a particular implementation of a method 1900 of searching media files for sounds is shown. In a particular aspect, one or more operations of the method 1900 are performed by at least one of the media search engine 130, the processor(s) 190, the device 102, the system 100 of FIG. 1, or a combination thereof.

The method 1900 enables searching media files (e.g., media files 152 of FIGS. 1-5) for particular sounds. The method 1900 may be initiated, performed, or controlled by one or more processors (e.g., the processor(s) 190 of FIG. 1) executing instructions of a media search engine (e.g., the media search engine 130 of FIGS. 1-5). The media files can include user generated media files, downloaded media files, or media files accessed in some other manner. Further, the media files can include any file storing audio content, such as audio files, video files, virtual reality files, or combinations thereof.

The method 1900 includes, at block 1902, generating one or more query caption embeddings based on a query. For example, the sound captioning engine 146 of FIGS. 1-5 may be operable to generate the query caption embedding 210 based on the query 120. The query 120 can include text (e.g., as in the text query 202 of FIGS. 2 and 3) or audio (e.g., as in the audio query 402 of FIG. 4). The query 120 can include, for example, a natural-language sequence of words describing a non-speech sound, or an audio sample representing a sound.

In some implementations, the query 120 includes a first set of words describing a target sound (e.g., the target sound description 304 of FIG. 3 or 5). In some such implementations, the query may further include a second set of words describing a context (e.g., the context terms 306 of FIG. 3). In such implementations, the one or more query caption embeddings may be determined based on the first set of words (e.g., the target sound description 304), and filter criteria for selecting a set of embeddings to be search may be determined based on the second set of words (e.g., the context terms 306). For example, each of the media files (or at least a subset of the media files) may be associated with file metadata indicative of a context associated with the media file and embeddings representing sounds of the media file. In this example, a set of embeddings associated with the media files that are to be compared to the query caption embedding 210 of the query 120 can be selected based on the file metadata and the filter criteria based on the second set of words (e.g., the context terms 306). Examples of context information that may be stored as part of the file metadata include, without limitation, a time stamp associated with the media file, a location associated with the media file, a file type associated with the media file, a source of the media file, non-audio content of the media file (e.g., a person present in an image of the media file), or a combination thereof.

In some implementations, the query can include audio data representing a sound to be searched (as distinct from a description of the sound). For example, a user may capture (using a microphone) audio data representing a sound, and the audio data representing the sound can be used as an audio query. In such implementations, the method 1900 may include generating one or more query sound captions based on the query audio data. In such implementations, the one or more query caption embeddings of the query are based on the one or more query sound captions. For example, the audio embedding generator 404 of FIG. 4 can generate the query audio embedding(s) 406 based on the audio query 402, and the tag embedding generator 408 can generate the query tag embedding(s) 410 based on the query audio embedding(s) 406. In this example, the query caption embedding 210 is based on the query tag embedding(s) 410.

The method 1900 also includes, at block 1904, selecting one or more caption embeddings from among the set of embeddings associated with the set of media files of the file repository. Each caption embedding represents a corresponding sound caption and each sound caption includes a natural-language text description of a sound.

In a particular aspect, the one or more caption embeddings are selected based on a similarity metric indicative of similarity between the one or more caption embeddings and the one or more query caption embeddings. For example, the method 1900 may include determining values of the similarity metric based on distances, in an embedding space, between the caption embedding(s) and the query caption embedding(s).

The method 1900 further includes, at block 1906, generating search results identifying one or more first media files of the set of media files, where each of the one or more first media files is associated with at least one of the one or more caption embeddings. In some implementations, the search results indicate a media file including a sound that corresponds to the query and a playback time of the sound in the media file. For example, a caption embedding may describe a particular sound associated with a particular media file, and the caption embedding may be associated with a time index indicating an approximate playback time of the particular media file at which the particular sound occurs. In this example, the search results may include information identifying the media file, the particular sound (e.g., a sound caption or sound tag(s) describing the particular sound), and the time index associated with the particular sound.

Although the method 1900 illustrated in the flowchart in FIG. 19 describes searching caption embeddings of media files based on a query caption embedding representing a query, the method 1900 may also include searching other types of embeddings to generate the search results. For example, in some implementations, the method 1900 may also include searching tag embeddings of media files based on tag embedding(s) representing a query. In this example, one or more media files of the set of media files is associated with one or more tag embeddings (e.g., the tag embeddings 514 of FIG. 5) representing one or more sound tags (e.g., the sound tags 512 of FIG. 5) associated with the media files.

In some such implementations, the method 1900 includes generating one or more query tag embeddings based on the query. For example, the tag embedding generator 408 may generate the query tag embedding(s) 410 based on the query 120. Additionally, in such implementations, the method 1900 may also include selecting one or more tag embeddings from among the set of embeddings, where the one or more tag embeddings are selected based on a similarity metric indicative of similarity between the one or more tag embeddings and the one or more query tag embeddings. In such implementations, the search results further identify one or more media files associated with at least one of the one or more tag embeddings.

Additionally, or alternatively, in some implementations, one or more media files of the set of media files is associated with one or more audio embeddings of one or more sounds in the media file(s). In such implementations, the method 1900 may also include generating one or more query audio embeddings based on audio data of the query and comparing the query audio embeddings to the audio embedding(s) associated with the media files. Further, in such implementations, the query caption embedding representing the query may be generated based on the audio data of the query. For example, the audio embedding generator 404 of FIG. 4 or FIG. 5 may generate the query audio embedding(s) 406 based on the audio data of the audio query 402. In this example, the tag embedding generator 408 generates the query tag embedding(s) 410 based on the query audio embedding(s) 406, and the caption embedding generator 242 generates the query caption embedding 210 based on the query tag embedding(s) 410.

In some such implementations, the query tag embedding(s), the query audio embedding(s), or both, may also be used to search the media files for particular sounds represented in the audio query. For example, the method 1900 may include selecting one or more audio embeddings from among the set of embeddings, where the one or more audio embeddings are selected based on a similarity metric indicative of similarity between the one or more audio embeddings and the query audio embeddings. In this example, the search results further identify one or more media files associated with at least one of the one or more audio embeddings.

In some implementations, the method 1900 also includes sorting the search results based on a ranking associated with each. For example, the ranking of each search result may be based on values of the similarity metrics (e.g., search results that are more similar to the query may be assigned higher rank values in the search results). When the method 1900 includes searching based on multiple types of embeddings (caption/sentence embeddings, tag embeddings, and/or audio embeddings), the similarity metrics associated with the different types of embeddings may be weighted to assign rankings used to sort the search results. To illustrate, a first set of media files of the search results may be identified based on comparing a query caption embedding based on a query to caption embeddings of the media files, a second set of media files of the search results may be identified based on comparing audio embedding(s) based on the query to audio embeddings of the media files, and a third set of media files of the search results may be identified based on comparing tag embedding(s) based on the query to tag embeddings of the media files. In this illustrative example, similarity metrics associated with the first set of media files are weighted differently than similarity metrics associated with the second set of media files, differently than similarity metrics associated with the third set of media files, or both.

In some implementations, the method 1900 may also include operations to add one or more new media files to the file repository. For example, in such implementations, the method 1900 includes obtaining an additional media file for storage at the file repository and processing the additional media file to detect one or more sounds represented in the additional media file. In this example, the method 1900 also includes generating one or more embeddings (e.g., audio embedding(s), tag embedding(s), caption embedding(s), or a combination thereof) associated with the one or more sounds detected in the additional media file and storing the additional media file and the one or more embeddings in the file repository. In this example, in response to receipt of a subsequent query, the method 1900 includes searching the one or more embeddings associated with the additional media file.

The method 1900 of FIG. 19 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1900 of FIG. 19 may be performed by a processor that executes instructions, such as described with reference to FIG. 20.

Figure 20:
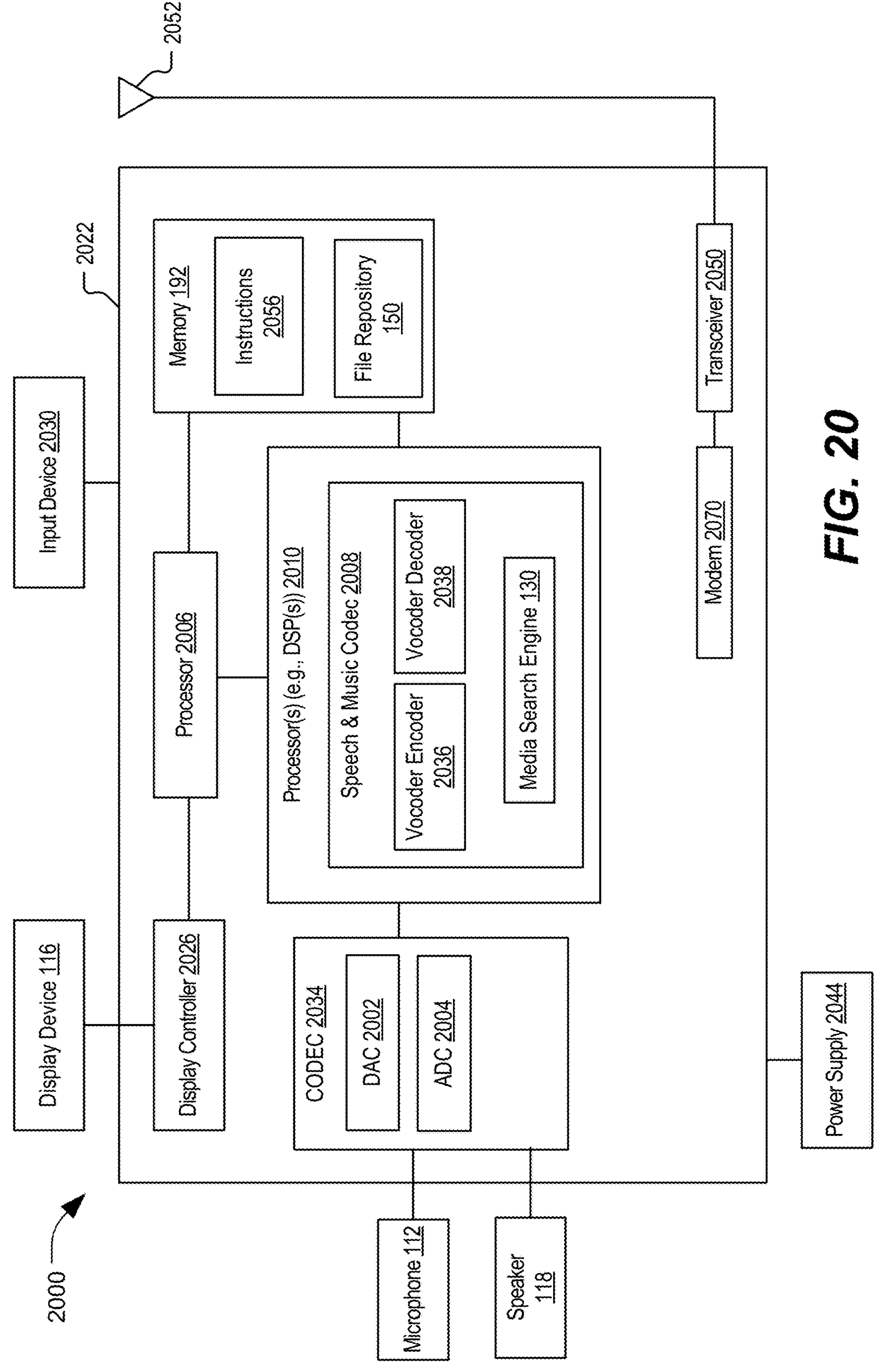
FIG. 20 is a block diagram of a particular illustrative example of a device that is operable to search media files for sounds, in accordance with some examples of the present disclosure.

Referring to FIG. 20, a block diagram of a particular illustrative implementation of a device is depicted and generally designated 2000. In various implementations, the device 2000 may have more or fewer components than illustrated in FIG. 20. In an illustrative implementation, the device 2000 may correspond to the device 102. In an illustrative implementation, the device 2000 may perform one or more operations described with reference to FIGS. 1-19.

In a particular implementation, the device 2000 includes a processor 2006 (e.g., a central processing unit (CPU)). The device 2000 may include one or more additional processors 2010 (e.g., one or more DSPs). In a particular aspect, the processor(s) 190 of FIG. 1 correspond to the processor 2006, the processors 2010, or a combination thereof. The processors 2010 may include a speech and music coder-decoder (CODEC) 2008 that includes a voice coder ("vocoder") encoder 2036, a vocoder decoder 2038, the media search engine 130, or a combination thereof.

The device 2000 may include the memory 192 and a CODEC 2034. The memory 192 may include instructions 2056 that are executable by the one or more additional processors 2010 (or the processor 2006) to implement the functionality described with reference to the media search engine 130. In the example illustrated in FIG. 20, the memory 192 also includes the file repository 150.

In FIG. 20, the device 2000 includes a modem 2070 coupled, via a transceiver 2050, to an antenna 2052. The modem 2070, the transceiver 2050, and the antenna 2052 may be operable to receive an input media stream, to transmit an output media stream, or both. For example, the device 2000 may receive media files to be stored in the file repository 150 via the modem 2070, may receive a query via the modem 2070, or may send search results to another device via the modem 2070.

The device 2000 may include the display device 116 coupled to a display controller 2026. The speaker 118 and the microphone 112 may be coupled to the CODEC 2034. The CODEC 2034 may include a digital-to-analog converter (DAC) 2002, an analog-to-digital converter (ADC) 2004, or both. In a particular implementation, the CODEC 2034 may receive analog signals from the microphone 112, convert the analog signals to digital signals using the analog-to-digital converter 2004, and provide the digital signals to the speech and music codec 2008. The speech and music codec 2008 may process the digital signals, and the digital signals may further be processed by the media search engine 130. In a particular implementation, the speech and music codec 2008 may provide digital signals to the CODEC 2034. The CODEC 2034 may convert the digital signals to analog signals using the digital-to-analog converter 2002 and may provide the analog signals to the speaker 118.

In a particular implementation, the device 2000 may be included in a system-in-package or system-on-chip device 2022. In a particular implementation, the memory 192, the processor 2006, the processors 2010, the display controller 2026, the CODEC 2034, and the modem 2070 are included in the system-in-package or system-on-chip device 2022. In a particular implementation, an input device 2030 and a power supply 2044 are coupled to the system-in-package or the system-on-chip device 2022. Moreover, in a particular implementation, as illustrated in FIG. 20, the display device 116, the input device 2030, the speaker 118, the microphone 112, the antenna 2052, and the power supply 2044 are external to the system-in-package or the system-on-chip device 2022. In a particular implementation, each of the display device 116, the input device 2030, the speaker 118, the microphone 112, the antenna 2052, and the power supply 2044 may be coupled to a component of the system-in-package or the system-on-chip device 2022, such as an interface or a controller.

The device 2000 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described implementations, an apparatus includes means for generating one or more query caption embeddings based on a query. For example, the means for generating one or more query caption embeddings based on a query can correspond to the media search engine 130, the sound captioning engine 146, the embedding generator(s) 142, the caption embedding generator 242, the caption embedding generator 688, the caption embedding generator 788, the processor(s) 190, the processor 2006, the processor(s) 2010, one or more other circuits or components configured to generate query caption embeddings, or any combination thereof.

In conjunction with the described implementations, the apparatus also includes means for selecting one or more caption embeddings from among a set of embeddings associated with a set of media files of a file repository, where each caption embedding represents a corresponding sound caption and each sound caption includes a natural-language text description of a sound, and where the one or more caption embeddings are selected based on a similarity metric indicative of similarity between the one or more caption embeddings and the one or more query caption embeddings. For example, the means for selecting one or more caption embeddings can correspond to the media search engine 130, the comparator 140, the processor(s) 190, the processor 2006, the processor(s) 2010, one or more other circuits or components configured to select caption embeddings, or any combination thereof.

In conjunction with the described implementations, the apparatus also includes means for generating search results identifying one or more first media files of the set of media files, where each of the one or more first media files is associated with at least one of the one or more caption embeddings. For example, the means for generating search results can correspond to the media search engine 130, the comparator 140, the processor(s) 190, the processor 2006, the processor(s) 2010, one or more other circuits or components configured to generate search results, or any combination thereof.

In some implementations, a non-transitory computer-readable medium (e.g., a computer-readable storage device, such as the memory 192) includes instructions (e.g., the instructions 2056) that, when executed by one or more processors (e.g., the one or more processors 190, the one or more processors 2010 or the processor 2006), cause the one or more processors to generate one or more query caption embeddings based on a query. The instructions are further executable by the one or more processors to select one or more caption embeddings from among a set of embeddings associated with a set of media files of a file repository, where each caption embedding represents a corresponding sound caption and each sound caption includes a natural-language text description of a sound, and where the one or more caption embeddings are selected based on a similarity metric indicative of similarity between the one or more caption embeddings and the one or more query caption embeddings. The instructions are also executable by the one or more processors to generate search results identifying one or more first media files of the set of media files, where each of the one or more first media files is associated with at least one of the one or more caption embeddings.

Particular aspects of the disclosure are described below in sets of interrelated Examples:

According to Example 1, a device includes one or more processors configured to: generate one or more query caption embeddings based on a query; select one or more caption embeddings from among a set of embeddings associated with a set of media files of a file repository, wherein each caption embedding represents a corresponding sound caption and each sound caption includes a natural-language text description of a sound, wherein the one or more caption embeddings are selected based on a first similarity metric indicative of similarity between the one or more caption embeddings and the one or more query caption embeddings; and generate search results identifying one or more first media files of the set of media files, each of the one or more first media files associated with at least one of the one or more caption embeddings.

Example 2 includes the device of Example 1, wherein the query includes a natural-language sequence of words describing a non-speech sound.

Example 3 includes the device of Example 1 or Example 2, wherein the query includes a first set of words describing a target sound and a second set of words describing a context, and wherein the one or more processors are configured to determine the one or more query caption embeddings based on the first set of words.

Example 4 includes the device of Example 3, wherein each media file of at least a subset of the set of media files is associated with file metadata indicative of a context associated with the media file, and wherein the one or more processors are configured to select the set of embeddings from which the one or more caption embeddings are selected based on the second set of words of the query and the file metadata.

Example 5 includes the device of Example 4, wherein the file metadata of a particular media file indicates a time stamp associated with the media file, a location associated with the media file, or both.

Example 6 includes the device of any of Examples 1 to 5, wherein a particular caption embedding describes a particular sound associated with a particular media file and wherein the particular caption embedding is associated with a time index indicating an approximate playback time of the particular media file at which the particular sound occurs.

Example 7 includes the device of any of Examples 1 to 6, wherein the search results further indicate, for a particular media file, a time index associated with a particular sound.

Example 8 includes the device of any of Examples 1 to 7, wherein the set of media files includes one or more audio files, one or more video files, one or more virtual reality files, or a combination thereof.

Example 9 includes the device of any of Examples 1 to 8, wherein the query includes query audio data and wherein the one or more query caption embeddings are based on the query audio data.

Example 10 includes the device of any of Examples 1 to 9, wherein a particular media file of the set of media files is further associated with one or more audio embeddings of one or more sounds in the particular media file, and wherein the set of embeddings associated with the set of media files include the one or more audio embeddings.

Example 11 includes the device of Example 10, wherein the one or more query caption embeddings are based on query audio data of the query and the one or more processors are further configured to: generate a query audio embedding based on the query audio data; and select one or more audio embeddings from among the set of embeddings, wherein the one or more audio embeddings are selected based on a second similarity metric indicative of similarity between the one or more audio embeddings and the query audio embeddings, wherein the search results further identify one or more second media files of the set of media files, each of the one or more second media files associated with at least one of the one or more audio embeddings.

Example 12 includes the device of Example 11, wherein the one or more processors are further configured to rank the search results based on similarity values, and wherein values of the first similarity metric associated with the one or more first media files are weighted differently than values of the second similarity metric of the one or more second media files to rank the search results.

Example 13 includes the device of any of Examples 1 to 12, wherein a particular media file of the set of media files is further associated with one or more tag embeddings representing one or more sound tags associated with the particular media file, and wherein the set of embeddings associated with the set of media files include the one or more tag embeddings.

Example 14 includes the device of Example 13, wherein the one or more processors are further configured to: generate one or more query tag embeddings based on the query; and select one or more tag embeddings from among the set of embeddings, wherein the one or more tag embeddings are selected based on a third similarity metric indicative of similarity between the one or more tag embeddings and the one or more query tag embeddings, wherein the search results further identify one or more third media files of the set of media files, each of the one or more third media files associated with at least one of the one or more tag embeddings.

Example 15 includes the device of Example 14, wherein the one or more processors are further configured to rank the search results based on similarity values, and wherein values of the first similarity metric associated with the one or more first media files are weighted differently than values of the third similarity metric of the one or more third media files to rank the search results.

Example 16 includes the device of any of Examples 1 to 15, wherein the one or more processors are further configured to: obtain an additional media file for storage at the file repository; process the additional media file to detect one or more sounds represented in the additional media file; generate one or more embeddings associated with the one or more sounds detected in the additional media file; store the additional media file and the one or more embeddings in the file repository; and in response to receipt of a subsequent query, search the one or more embeddings associated with the additional media file.

Example 17 includes the device of Example 16, wherein generating the one or more embeddings includes generating a caption embedding associated with the one or more sounds.

Example 18 includes the device of Example 16, wherein, to generate the one or more embeddings associated with the one or more sounds represented in the additional media file, the one or more processors are configured to generate an audio embedding representing a particular sound detected in the additional media file.

Example 19 includes the device of any of Examples 1 to 18, wherein the one or more processors are further configured to determine the similarity metric based on a distance, in an embedding space, between the one or more caption embeddings and the one or more query caption embeddings.

According to Example 20, a method includes generating, by one or more processors, one or more query caption embeddings based on a query; selecting, by the one or more processors, one or more caption embeddings from among a set of embeddings associated with a set of media files of a file repository, wherein each caption embedding represents a corresponding sound caption and each sound caption includes a natural-language text description of a sound, wherein the one or more caption embeddings are selected based on a first similarity metric indicative of similarity between the one or more caption embeddings and the one or more query caption embeddings; and generating, by the one or more processors, search results identifying one or more first media files of the set of media files, each of the one or more first media files associated with at least one of the one or more caption embeddings.

Example 21 includes the method of Example 20, wherein the query includes a natural-language sequence of words describing a non-speech sound.

Example 22 includes the method of Example 20 or Example 21, wherein the query includes a first set of words describing a target sound and a second set of words describing a context, and further including determining the one or more query caption embeddings based on the first set of words.

Example 23 includes the method of Example 22, wherein each media file of at least a subset of the set of media files is associated with file metadata indicative of a context associated with the media file, and further including selecting the set of embeddings from which the one or more caption embeddings are selected based on the second set of words of the query and the file metadata.

Example 24 includes the method of Example 23, wherein the file metadata of a particular media file indicates a time stamp associated with the media file, a location associated with the media file, or both.

Example 25 includes the method of any of Examples 20 to 24, wherein a particular caption embedding describes a particular sound associated with a particular media file and wherein the particular caption embedding is associated with a time index indicating an approximate playback time of the particular media file at which the particular sound occurs.

Example 26 includes the method of any of Examples 20 to 25, wherein the search results further indicate, for a particular media file, a time index associated with a particular sound.

Example 27 includes the method of any of Examples 20 to 26, wherein the set of media files includes one or more audio files, one or more video files, one or more virtual reality files, or a combination thereof.

Example 28 includes the method of any of Examples 20 to 27, wherein the query includes query audio data and wherein the one or more query caption embeddings are based on the query audio data.

Example 29 includes the method of any of Examples 20 to 28, wherein a particular media file of the set of media files is further associated with one or more audio embeddings of one or more sounds in the particular media file, and wherein the set of embeddings associated with the set of media files include the one or more audio embeddings.

Example 30 includes the method of Example 29, wherein the one or more query caption embeddings are based on query audio data of the query and further including: generating a query audio embedding based on the query audio data; and selecting one or more audio embeddings from among the set of embeddings, wherein the one or more audio embeddings are selected based on a second similarity metric indicative of similarity between the one or more audio embeddings and the query audio embeddings, wherein the search results further identify one or more second media files of the set of media files, each of the one or more second media files associated with at least one of the one or more audio embeddings.

Example 31 includes the method of Example 30, further including ranking the search results based on similarity values, and wherein values of the first similarity metric associated with the one or more first media files are weighted differently than values of the second similarity metric of the one or more second media files to rank the search results.

Example 32 includes the method of any of Examples 20 to 31, wherein a particular media file of the set of media files is further associated with one or more tag embeddings representing one or more sound tags associated with the particular media file, and wherein the set of embeddings associated with the set of media files include the one or more tag embeddings.

Example 33 includes the method of Example 32, further including: generating one or more query tag embeddings based on the query; and selecting one or more tag embeddings from among the set of embeddings, wherein the one or more tag embeddings are selected based on a third similarity metric indicative of similarity between the one or more tag embeddings and the one or more query tag embeddings, wherein the search results further identify one or more third media files of the set of media files, each of the one or more third media files associated with at least one of the one or more tag embeddings.

Example 34 includes the method of Example 33, further including ranking the search results based on similarity values, and wherein values of the first similarity metric associated with the one or more first media files are weighted differently than values of the third similarity metric of the one or more third media files to rank the search results.

Example 35 includes the method of any of Examples 20 to 34, further including: obtaining an additional media file for storage at the file repository; processing the additional media file to detect one or more sounds represented in the additional media file; generating one or more embeddings associated with the one or more sounds detected in the additional media file; storing the additional media file and the one or more embeddings in the file repository; and in response to receipt of a subsequent query, searching the one or more embeddings associated with the additional media file.

Example 36 includes the method of Example 35, wherein generating the one or more embeddings include generating a caption embedding associated with the one or more sounds.

Example 37 includes the method of Example 35, wherein generating the one or more embeddings associated with the one or more sounds represented in the additional media file includes generating an audio embedding representing a particular sound detected in the additional media file.

Example 38 includes the method of any of Examples 20 to 37, further including determining the similarity metric based on a distance, in an embedding space, between the one or more caption embeddings and the one or more query caption embeddings.

According to Example 39, a non-transitory computer-readable storage device stores instructions that are executable by one or more processors to cause the one or more processors to: generate one or more query caption embeddings based on a query; select one or more caption embeddings from among a set of embeddings associated with a set of media files of a file repository, wherein each caption embedding represents a corresponding sound caption and each sound caption includes a natural-language text description of a sound, wherein the one or more caption embeddings are selected based on a first similarity metric indicative of similarity between the one or more caption embeddings and the one or more query caption embeddings; and generate search results identifying one or more first media files of the set of media files, each of the one or more first media files associated with at least one of the one or more caption embeddings.

Example 40 includes the non-transitory computer-readable storage device of Example 39, wherein the query includes a natural-language sequence of words describing a non-speech sound.

Example 41 includes the non-transitory computer-readable storage device of Example 39 or Example 40, wherein the query includes a first set of words describing a target sound and a second set of words describing a context, and wherein the instructions are further executable to cause one or more processors to determine the one or more query caption embeddings based on the first set of words.

Example 42 includes the non-transitory computer-readable storage device of Example 41, wherein each media file of at least a subset of the set of media files is associated with file metadata indicative of a context associated with the media file, and wherein the instructions are further executable to cause one or more processors to select the set of embeddings from which the one or more caption embeddings are selected based on the second set of words of the query and the file metadata.

Example 43 includes the non-transitory computer-readable storage device of Example 42, wherein the file metadata of a particular media file indicates a time stamp associated with the media file, a location associated with the media file, or both.

Example 44 includes the non-transitory computer-readable storage device of any of Examples 39 to 43, wherein a particular caption embedding describes a particular sound associated with a particular media file and wherein the particular caption embedding is associated with a time index indicating an approximate playback time of the particular media file at which the particular sound occurs.

Example 45 includes the non-transitory computer-readable storage device of any of Examples 39 to 44, wherein the search results further indicate, for a particular media file, a time index associated with a particular sound.

Example 46 includes the non-transitory computer-readable storage device of any of Examples 39 to 45, wherein the set of media files includes one or more audio files, one or more video files, one or more virtual reality files, or a combination thereof.

Example 47 includes the non-transitory computer-readable storage device of any of Examples 39 to 46, wherein the query includes query audio data and wherein the one or more query caption embeddings are based on the query audio data.

Example 48 includes the non-transitory computer-readable storage device of any of Examples 39 to 47, wherein a particular media file of the set of media files is further associated with one or more audio embeddings of one or more sounds in the particular media file, and wherein the set of embeddings associated with the set of media files include the one or more audio embeddings.

Example 49 includes the non-transitory computer-readable storage device of Example 48, wherein the one or more query caption embeddings are based on query audio data of the query and the instructions are further executable to cause one or more processors to: generate a query audio embedding based on the query audio data; and select one or more audio embeddings from among the set of embeddings, wherein the one or more audio embeddings are selected based on a second similarity metric indicative of similarity between the one or more audio embeddings and the query audio embeddings, wherein the search results further identify one or more second media files of the set of media files, each of the one or more second media files associated with at least one of the one or more audio embeddings.

Example 50 includes the non-transitory computer-readable storage device of Example 49, wherein the instructions are further executable to cause one or more processors to rank the search results based on similarity values, and wherein values of the first similarity metric associated with the one or more first media files are weighted differently than values of the second similarity metric of the one or more second media files to rank the search results.

Example 51 includes the non-transitory computer-readable storage device of any of Examples 39 to 50, wherein a particular media file of the set of media files is further associated with one or more tag embeddings representing one or more sound tags associated with the particular media file, and wherein the set of embeddings associated with the set of media files include the one or more tag embeddings.

Example 52 includes the non-transitory computer-readable storage device of Example 51, wherein the instructions are further executable to cause one or more processors to: generate one or more query tag embeddings based on the query; and select one or more tag embeddings from among the set of embeddings, wherein the one or more tag embeddings are selected based on a third similarity metric indicative of similarity between the one or more tag embeddings and the one or more query tag embeddings, wherein the search results further identify one or more third media files of the set of media files, each of the one or more third media files associated with at least one of the one or more tag embeddings.

Example 53 includes the non-transitory computer-readable storage device of Example 52, wherein the instructions are further executable to cause one or more processors to rank the search results based on similarity values, and wherein values of the first similarity metric associated with the one or more first media files are weighted differently than values of the third similarity metric of the one or more third media files to rank the search results.

Example 54 includes the non-transitory computer-readable storage device of any of Examples 39 to 53, wherein the instructions are further executable to cause one or more processors to: obtain an additional media file for storage at the file repository; process the additional media file to detect one or more sounds represented in the additional media file; generate one or more embeddings associated with the one or more sounds detected in the additional media file; store the additional media file and the one or more embeddings in the file repository; and in response to receipt of a subsequent query, search the one or more embeddings associated with the additional media file.

Example 55 includes the non-transitory computer-readable storage device of Example 54, wherein generating the one or more embeddings includes generating a caption embedding associated with the one or more sounds.

Example 56 includes the non-transitory computer-readable storage device of Example 54, wherein, to generate the one or more embeddings associated with the one or more sounds represented in the additional media file, the instructions are executable to cause one or more processors to generate an audio embedding representing a particular sound detected in the additional media file.

Example 57 includes the non-transitory computer-readable storage device of any of Examples 39 to 56, wherein the instructions are further executable to cause one or more processors to determine the similarity metric based on a distance, in an embedding space, between the one or more caption embeddings and the one or more query caption embeddings.

According to Example 58, an apparatus includes means for generating one or more query caption embeddings based on a query; means for selecting one or more caption embeddings from among a set of embeddings associated with a set of media files of a file repository, wherein each caption embedding represents a corresponding sound caption and each sound caption includes a natural-language text description of a sound, wherein the one or more caption embeddings are selected based on a first similarity metric indicative of similarity between the one or more caption embeddings and the one or more query caption embeddings; and means for generating search results identifying one or more first media files of the set of media files, each of the one or more first media files associated with at least one of the one or more caption embeddings.

Example 59 includes the apparatus of Example 58, wherein the query includes a natural-language sequence of words describing a non-speech sound.

Example 60 includes the apparatus of Example 58 or Example 59, wherein the query includes a first set of words describing a target sound and a second set of words describing a context, and further including means for determining the one or more query caption embeddings based on the first set of words.

Example 61 includes the apparatus of Example 60, wherein each media file of at least a subset of the set of media files is associated with file metadata indicative of a context associated with the media file, and further including means for selecting the set of embeddings from which the one or more caption embeddings are selected based on the second set of words of the query and the file metadata.

Example 62 includes the apparatus of Example 61, wherein the file metadata of a particular media file indicates a time stamp associated with the media file, a location associated with the media file, or both.

Example 63 includes the apparatus of any of Examples 58 to 62, wherein a particular caption embedding describes a particular sound associated with a particular media file and wherein the particular caption embedding is associated with a time index indicating an approximate playback time of the particular media file at which the particular sound occurs.

Example 64 includes the apparatus of any of Examples 58 to 63, wherein the search results further indicate, for a particular media file, a time index associated with a particular sound.

Example 65 includes the apparatus of any of Examples 58 to 64, wherein the set of media files includes one or more audio files, one or more video files, one or more virtual reality files, or a combination thereof.

Example 66 includes the apparatus of any of Examples 58 to 65, wherein the query includes query audio data and wherein the one or more query caption embeddings are based on the query audio data.

Example 67 includes the apparatus of any of Examples 58 to 66, wherein a particular media file of the set of media files is further associated with one or more audio embeddings of one or more sounds in the particular media file, and wherein the set of embeddings associated with the set of media files include the one or more audio embeddings.

Example 68 includes the apparatus of Example 67, wherein the one or more query caption embeddings are based on query audio data of the query and further including: means for generating a query audio embedding based on the query audio data; and means for selecting one or more audio embeddings from among the set of embeddings, wherein the one or more audio embeddings are selected based on a second similarity metric indicative of similarity between the one or more audio embeddings and the query audio embeddings, wherein the search results further identify one or more second media files of the set of media files, each of the one or more second media files associated with at least one of the one or more audio embeddings.

Example 69 includes the apparatus of Example 68, further including means for ranking the search results based on similarity values, and wherein values of the first similarity metric associated with the one or more first media files are weighted differently than values of the second similarity metric of the one or more second media files to rank the search results.

Example 70 includes the apparatus of any of Examples 58 to 69, wherein a particular media file of the set of media files is further associated with one or more tag embeddings representing one or more sound tags associated with the particular media file, and wherein the set of embeddings associated with the set of media files include the one or more tag embeddings.

Example 71 includes the apparatus of Example 70, further including: means for generating one or more query tag embeddings based on the query; and means for selecting one or more tag embeddings from among the set of embeddings, wherein the one or more tag embeddings are selected based on a third similarity metric indicative of similarity between the one or more tag embeddings and the one or more query tag embeddings, wherein the search results further identify one or more third media files of the set of media files, each of the one or more third media files associated with at least one of the one or more tag embeddings.

Example 72 includes the apparatus of Example 71, further including means for ranking the search results based on similarity values, and wherein values of the first similarity metric associated with the one or more first media files are weighted differently than values of the third similarity metric of the one or more third media files to rank the search results.

Example 73 includes the apparatus of any of Examples 58 to 72, further including: means for obtaining an additional media file for storage at the file repository; means for processing the additional media file to detect one or more sounds represented in the additional media file; means for generating one or more embeddings associated with the one or more sounds detected in the additional media file; means for storing the additional media file and the one or more embeddings in the file repository; and means for searching the one or more embeddings associated with the additional media file in response to receipt of a subsequent query.

Example 74 includes the apparatus of Example 73, wherein generating the one or more embeddings includes generating a caption embedding associated with the one or more sounds.

Example 75 includes the apparatus of Example 73, wherein generating the one or more embeddings associated with the one or more sounds represented in the additional media file includes generating an audio embedding representing a particular sound detected in the additional media file.

Example 76 includes the apparatus of any of Examples 58 to 75, further including determining the similarity metric based on a distance, in an embedding space, between the one or more caption embeddings and the one or more query caption embeddings.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal.

In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:

one or more processors configured to:

generate one or more query caption embeddings representing multiple words that together form a semantic unit, based on a query, using a machine-learning model, wherein the query caption embeddings are based on sound captions extracted from the query that are natural-language descriptions of sounds and wherein outputs of the machine-learning model are one or more caption embeddings and locations of the one or more caption embeddings in a caption embedding space are indicative of semantic relationships among the sound captions, the semantic relationships corresponding to a similarity of semantic meaning between the sound captions, the similarity of semantic meaning distinct from a text comparison;

generate one or more context terms based on a portion of the query distinct from the semantic unit;

filter a set of media files to generate a set of filtered media files based on the context terms and metadata associated with the set of media files;

compare the one or more query caption embeddings, in the caption embedding space, to one or more second caption embeddings associated with the set of filtered media files, wherein each second caption embedding of the one or more second caption embeddings represents a corresponding sound caption and each sound caption includes a natural-language text description of a sound, to determine a first similarity metric, indicative of similarity between the one or more caption embeddings and the one or more query caption embeddings; and generate search results identifying one or more first media files of the set of filtered media files, each of the one or more first media files associated with at least one of the one or more caption embeddings.

2. The device of claim 1, wherein the query includes a natural-language sequence of words describing a non-speech sound.

3. The device of claim 1, wherein the context terms include a media format type, a particular time period, a media source, a media generation location, or a combination thereof.

4. The device of claim 1, wherein the context terms include one or more words identifying a person, and wherein filtering the set of media files includes comparing the context terms to one or more object tags in the metadata, the one or more object tags identifying people visible in a corresponding video.

5. The device of claim 1, wherein a particular caption embedding describes a particular sound associated with a particular media file and wherein the particular caption embedding is associated with a time index indicating an approximate playback time of the particular media file at which the particular sound occurs.

6. The device of claim 1, wherein the set of media files includes one or more audio files, one or more video files, one or more virtual reality files, or a combination thereof.

7. The device of claim 1, wherein the query includes query audio data and wherein the one or more query caption embeddings are based on the query audio data.

8. The device of claim 1, wherein a particular media file of the set of media files is further associated with one or more audio embeddings of one or more sounds in the particular media file, and wherein the set of embeddings associated with the set of media files include the one or more audio embeddings.

9. The device of claim 8, wherein the one or more query caption embeddings are based on query audio data of the query and the one or more processors are further configured to:

generate one or more query audio embeddings based on the query audio data; and compare the one or more query audio embeddings, in an audio embedding space, to one or more audio embeddings to determine, a second similarity metric indicative of similarity between the one or more audio embeddings and the one or more query audio embeddings, wherein the search results further identify one or more second media files of the set of filtered media files, each of the one or more second media files associated with at least one of the one or more audio embeddings.

10. The device of claim 9, wherein the one or more processors are further configured to rank the search results based on similarity values and wherein values of the first similarity metric associated with the one or more first media files are weighted differently than values of the second similarity metric of the one or more second media files to rank the search results.

11. The device of claim 1, wherein a particular media file of the set of media files is further associated with one or more tag embeddings representing one or more sound tags associated with the particular media file, and wherein the set of embeddings associated with the set of media files include the one or more tag embeddings.

12. The device of claim 11, wherein the one or more processors are further configured to:

generate one or more query tag embeddings based on the query; and compare the one or more query tag embeddings, in a tag embedding space, to one or more tag embeddings to determine a third similarity metric indicative of similarity between the one or more tag embeddings and the one or more query tag embeddings, wherein the search results further identify one or more third media files of the set of filtered media files, each of the one or more third media files associated with at least one of the one or more tag embeddings.

13. The device of claim 12, wherein the one or more processors are further configured to rank the search results based on similarity values and wherein values of the first similarity metric associated with the one or more first media files are weighted differently than values of the third similarity metric of the one or more third media files to rank the search results.

14. The device of claim 1, wherein the one or more processors are further configured to:

obtain an additional media file for storage at a file repository;

process the additional media file to detect one or more sounds represented in the additional media file;

generate one or more embeddings associated with the one or more sounds detected in the additional media file;

store the additional media file and the one or more embeddings in the file repository; and in response to receipt of a subsequent query, search the one or more embeddings associated with the additional media file.

15. The device of claim 1, wherein the one or more processors are further configured to determine the first similarity metric based on a distance, in an embedding space, between the one or more caption embeddings and the one or more query caption embeddings.

16. A method comprising:

generating, by one or more processors, one or more query caption embeddings representing multiple words that together form a semantic unit, based on a query, using a machine-learning model, wherein the query caption embeddings are based on sound captions extracted from the query that are natural-language descriptions of sounds and wherein outputs of the machine-learning model are one or more caption embeddings and locations of the one or more caption embeddings in a caption embedding space are indicative of semantic relationships among the sound captions, the semantic relationships corresponding to a similarity of semantic meaning between the sound captions, the similarity of semantic meaning distinct from a text comparison;

generating one or more context terms based on a portion of the query distinct from the semantic unit;

filtering a set of media files to generate a set of filtered media files based on the context terms and metadata associated with the set of media files;

comparing, by the one or more processors, the one or more query caption embeddings, in the caption embedding space, to one or more second caption embeddings associated with the set of filtered media files, wherein each second caption embedding of the one or more second caption embeddings represents a corresponding sound caption and each sound caption includes a natural-language text description of a sound, to determine, a first similarity metric indicative of similarity between the one or more caption embeddings and the one or more query caption embeddings; and generating, by the one or more processors, search results identifying one or more first media files of the set of filtered media files, each of the one or more first media files associated with at least one of the one or more caption embeddings.

17. The method of claim 16, wherein the query includes query audio data or a natural-language sequence of words describing a non-speech sound.

18. The method of claim 16, wherein the context terms include a media format type, a particular time period, a media source, a media generation location, or a combination thereof.

19. The method of claim 16, wherein the context terms include one or more words identifying a person, and wherein filtering the set of media files includes comparing the context terms to one or more object tags in the metadata, the one or more object tags identifying people visible in a corresponding video.

20. The method of claim 16, wherein a particular caption embedding describes a particular sound associated with a particular media file and wherein the particular caption embedding is associated with a time index indicating an approximate playback time of the particular media file at which the particular sound occurs.

21. The method of claim 20, wherein the one or more query caption embeddings are based on query audio data of the query and further comprising:

generating one or more query audio embeddings based on the query audio data; and comparing the one or more query audio embeddings, in an audio embedding space, to one or more audio embeddings to determine a second similarity metric indicative of similarity between the one or more audio embeddings and the one or more query audio embeddings, wherein the search results further identify one or more second media files of the set of filtered media files, each of the one or more second media files associated with at least one of the one or more audio embeddings.

22. The method of claim 16, further comprising:

generating one or more query tag embeddings based on the query; and comparing the one or more query tag embeddings, in a tag embedding space, to one or more tag embeddings to determine a third similarity metric indicative of similarity between the one or more tag embeddings and the one or more query tag embeddings, wherein the search results further identify one or more third media files of the set of filtered media files, each of the one or more third media files associated with at least one of the one or more tag embeddings.

23. The method of claim 16, further comprising:

obtaining an additional media file for storage at a file repository;

processing the additional media file to detect one or more sounds represented in the additional media file;

generating one or more embeddings associated with the one or more sounds detected in the additional media file;

storing the additional media file and the one or more embeddings in the file repository; and in response to receipt of a subsequent query, searching the one or more embeddings associated with the additional media file.

24. A non-transitory computer-readable storage device storing instructions that are executable by one or more processors to cause the one or more processors to:

generate one or more query caption embeddings representing multiple words that together form a semantic unit, based on a query, using a machine-learning model, wherein the query caption embeddings are based on sound captions extracted from the query that are natural-language descriptions of sounds and wherein outputs of the machine-learning model are one or more caption embeddings and locations of the one or more caption embeddings in a caption embedding space are indicative of semantic relationships among the sound captions, the semantic relationships corresponding to a similarity of semantic meaning between the sound captions, the similarity of semantic meaning distinct from a text comparison;

generate one or more context terms based on a portion of the query distinct from the semantic unit;

filter a set of media files to generate a set of filtered media files based on the context terms and metadata associated with the set of media files;

compare the one or more query caption embeddings, in the caption embedding space, to one or more second caption embeddings associated with the set of filtered media files, wherein each second caption embedding of the one or more second caption embeddings represents a corresponding sound caption and each sound caption includes a natural-language text description of a sound, to determine a first similarity metric, indicative of similarity between the one or more caption embeddings and the one or more query caption embeddings; and generate search results identifying one or more first media files of the set of filtered media files, each of the one or more first media files associated with at least one of the one or more caption embeddings.

25. The non-transitory computer-readable storage device of claim 24, wherein the query includes a first set of words describing a target sound and a second set of words describing a context, and wherein the instructions are further executable to cause one or more processors to determine the one or more query caption embeddings based on the first set of words.

26. The non-transitory computer-readable storage device of claim 24, wherein the instructions are further executable to cause one or more processors to:

obtain an additional media file for storage at a file repository;

process the additional media file to detect one or more sounds represented in the additional media file;

generate one or more embeddings associated with the one or more sounds detected in the additional media file;

store the additional media file and the one or more embeddings in the file repository; and in response to receipt of a subsequent query, search the one or more embeddings associated with the additional media file.

27. The non-transitory computer-readable storage device of claim 26, wherein generating the one or more embeddings includes generating a caption embedding associated with the one or more sounds.

28. The non-transitory computer-readable storage device of claim 24, wherein the instructions are further executable to cause one or more processors to determine the first similarity metric based on a distance, in an embedding space, between the one or more caption embeddings and the one or more query caption embeddings.

29. An apparatus comprising:

means for generating, by one or more processors, one or more query caption embeddings representing multiple words that together form a semantic unit, based on a query, using a machine-learning model, wherein the query caption embeddings are based on sound captions extracted from the query that are natural-language descriptions of sounds and wherein outputs of the machine-learning model are one or more caption embeddings and locations of the one or more caption embeddings in a caption embedding space are indicative of semantic relationships among the sound captions, the semantic relationships corresponding to a similarity of semantic meaning between the sound captions, the similarity of semantic meaning distinct from a text comparison;

means for generating one or more context terms based on a portion of the query distinct from the semantic unit;

means for filtering a set of media files to generate a set of filtered media files based on the context terms and metadata associated with the set of media files;

means for comparing, by the one or more processors, the one or more query caption embeddings, in the caption embedding space, to one or more second caption embeddings associated with the set of filtered media files, wherein each second caption embedding of the one or more second caption embeddings represents a corresponding sound caption and each sound caption includes a natural-language text description of a sound, to determine, a first similarity metric indicative of similarity between the one or more caption embeddings and the one or more query caption embeddings; and means for generating, by the one or more processors, search results identifying one or more first media files of the set of filtered media files, each of the one or more first media files associated with at least one of the one or more caption embeddings.

30. The apparatus of claim 29, wherein the means for generating the one or more query caption embeddings, the means for comparing the one or more caption embeddings, and the means for generating search results are integrated within a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, an internet-of-things (IoT) device, a virtual reality (VR) device, a base station, or a combination thereof.

* * * * *